Figure 1:
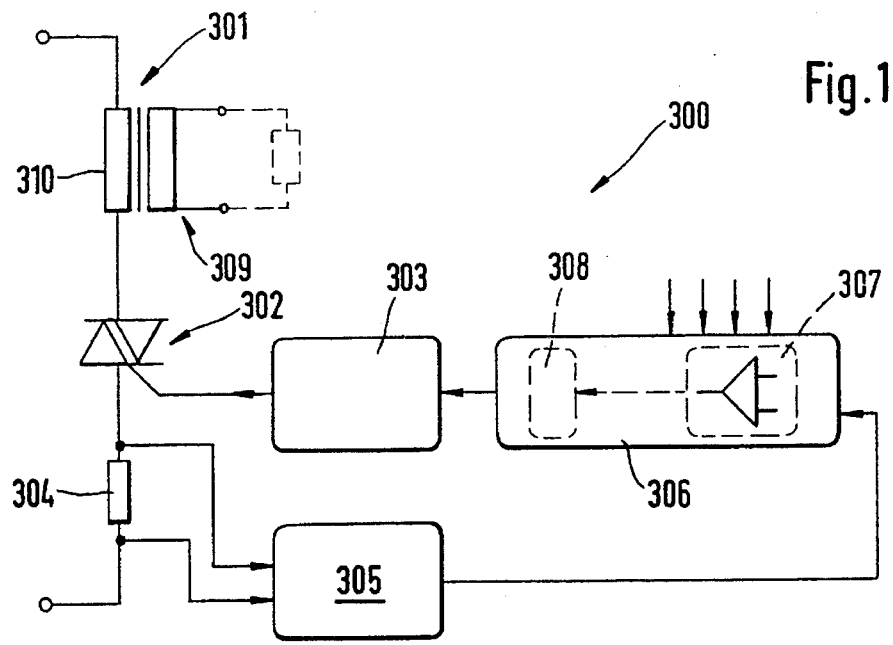

United States Patent [19]
Konstanzer

[11] Patent Number: 5,479,086
[45] Date of Patent: Dec. 26, 1995

[54] PROCESS AND DEVICE FOR REDUCING THE INRUSH CURRENT WHEN POWERING AN INDUCTIVE LOAD

[75] Inventor: Michael Konstanzer, Freiburg, Germany

[73] Assignee: Fraunhofer Gesellschaft Zur Förderung der Angewandten Forschung E.V., München, Germany

[21] Appl. No.: 941,123

[22] PCT Filed: Mar. 13, 1991

[86] PCT No.: PCT/DE91/00216

§ 371 Date: Oct. 30, 1992

§ 102(e) Date: Oct. 30, 1992

[87] PCT Pub. No.: WO91/17597

PCT Pub. Date: Nov. 14, 1991

[30] Foreign Application Priority Data

Apr. 30, 1990 [DE] Germany .......................... 40 13 888.7
Jun. 20, 1990 [DE] Germany .......................... 40 19 592.9

[51] Int. Cl.$^6$ .................................................. G05F 1/455
[52] U.S. Cl. ............................................. 323/238; 323/908
[58] Field of Search ..................................... 323/237, 238, 323/241, 300, 320, 321, 322, 901, 908; 363/49; 318/727, 729

[56] References Cited

U.S. PATENT DOCUMENTS

| 3,925,688 | 12/1975 | Kalfus | 307/252 B |
| 4,131,927 | 12/1978 | Tsuchiya | 361/6 |
| 4,806,838 | 2/1989 | Weber | 318/729 |

FOREIGN PATENT DOCUMENTS

| 549364 | 11/1959 | Belgium . |
| 0222727 | 5/1987 | European Pat. Off. . |
| 1488388 | 6/1969 | Germany . |
| 2424716 | 12/1975 | Germany . |
| 2530047 | 1/1977 | Germany . |
| 2743365 | 9/1978 | Germany . |
| 2735736 | 3/1979 | Germany . |
| 2746845 | 4/1979 | Germany . |
| 2812166 | 7/1979 | Germany . |
| 3513365 | 10/1986 | Germany . |

*Primary Examiner*—Peter S. Wong
*Assistant Examiner*—Adolf Berhane
*Attorney, Agent, or Firm*—Darby & Darby

[57] ABSTRACT

A transformer is energized from an a.c. source by initially applying the a.c. voltage to the transformer during small but progressively increasing fractions of a succession of initial half-cycles. This is continued until the rated voltage is achieved or until the reactive current exceeds a predetermined value below that which would cause tripping of the transformer. In the event that the reactive current reaches the predetermined value, the remanence of the transformer is set at a selected level by applying the a.c. voltage to the transformer during an additional half-cycle. The length of exposure of the transformer to the a.c. voltage during the additional half-cycle depends upon the circumstances. Once the remanence has been set, operation of the transformer proceeds normally.

85 Claims, 13 Drawing Sheets

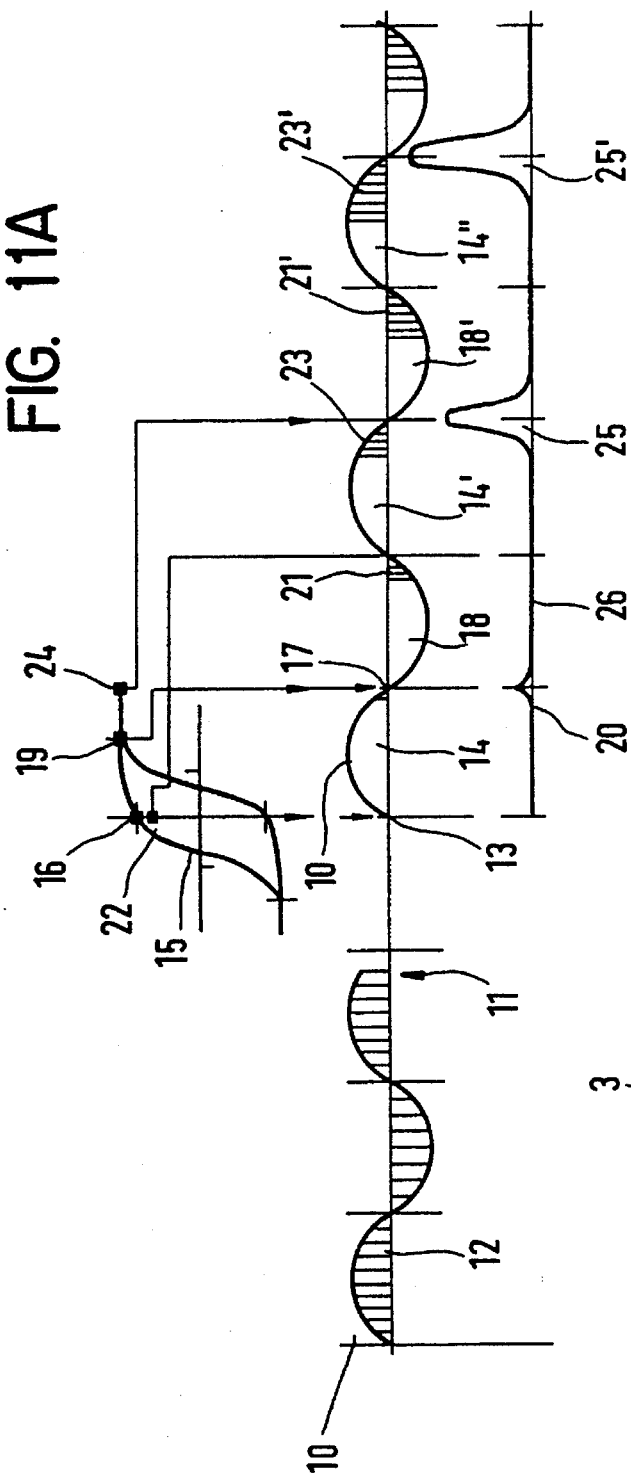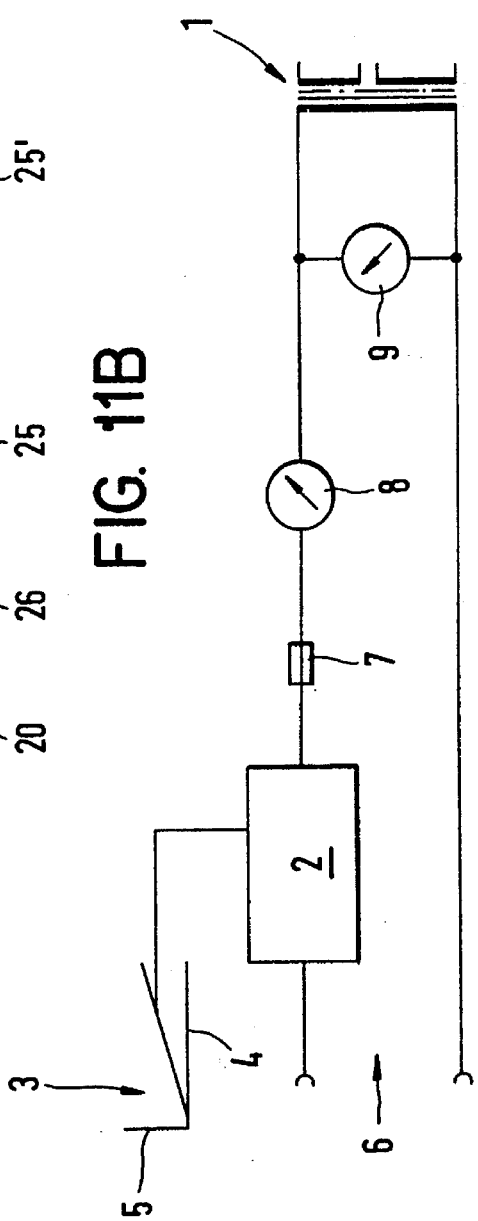

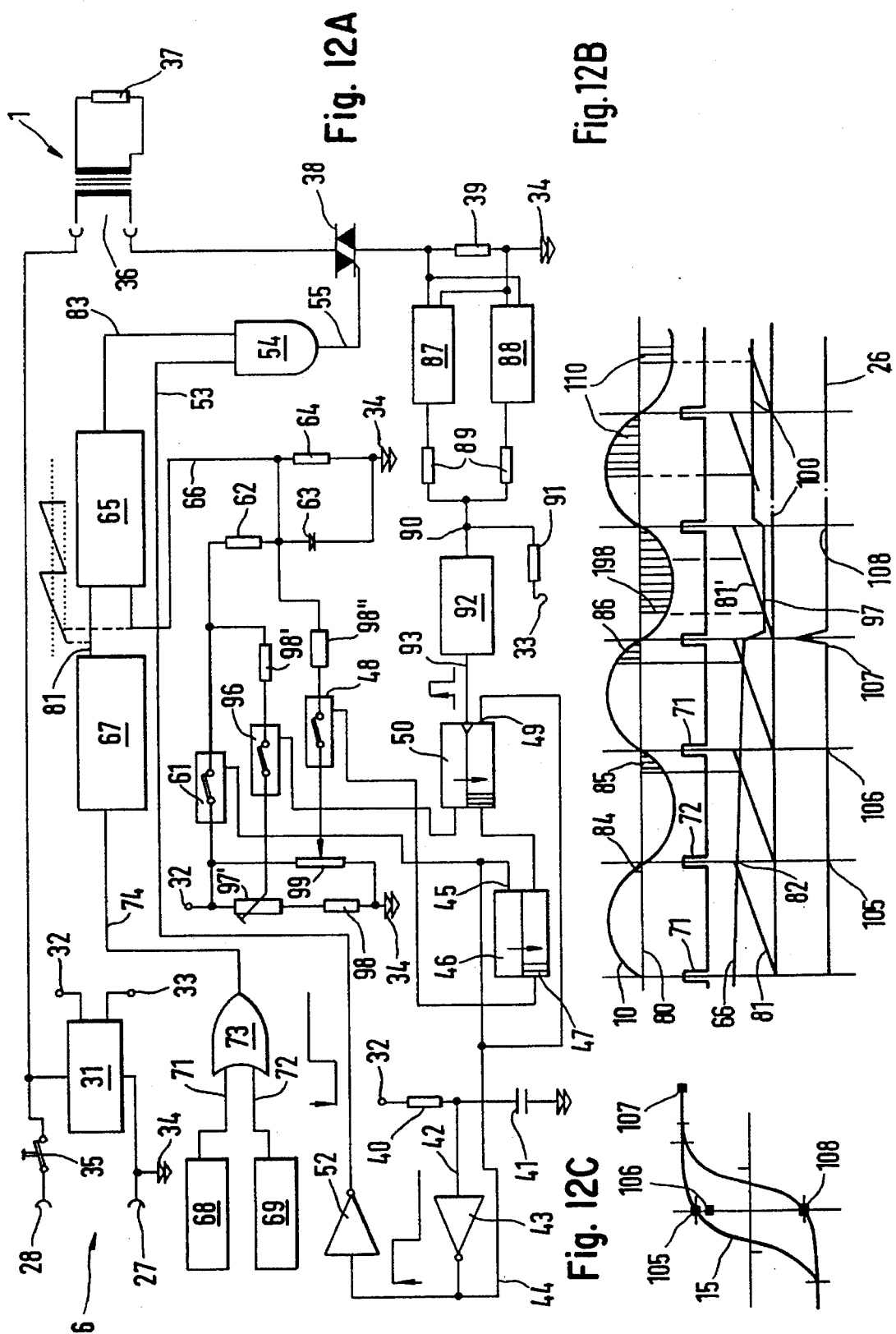

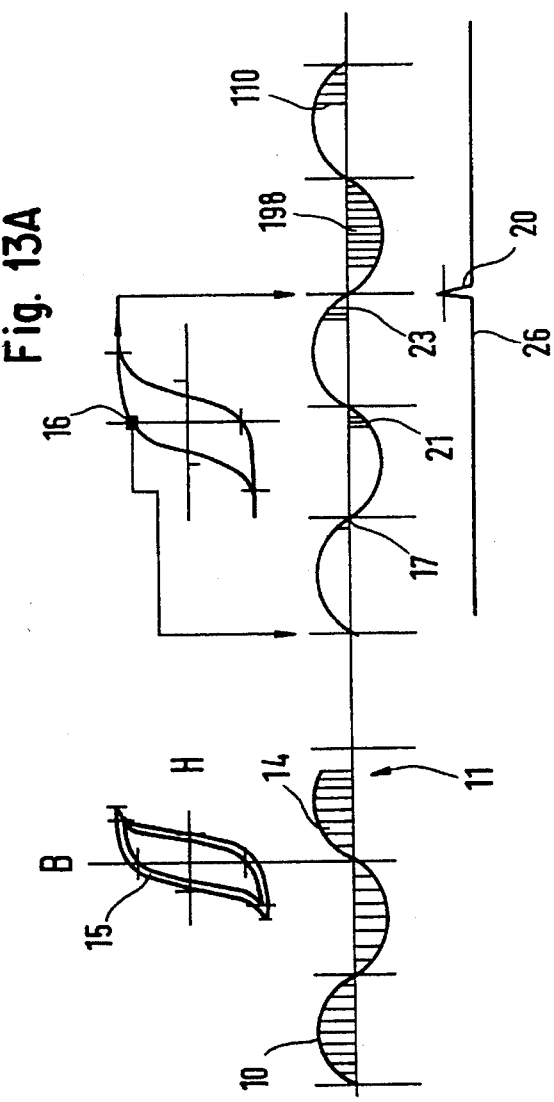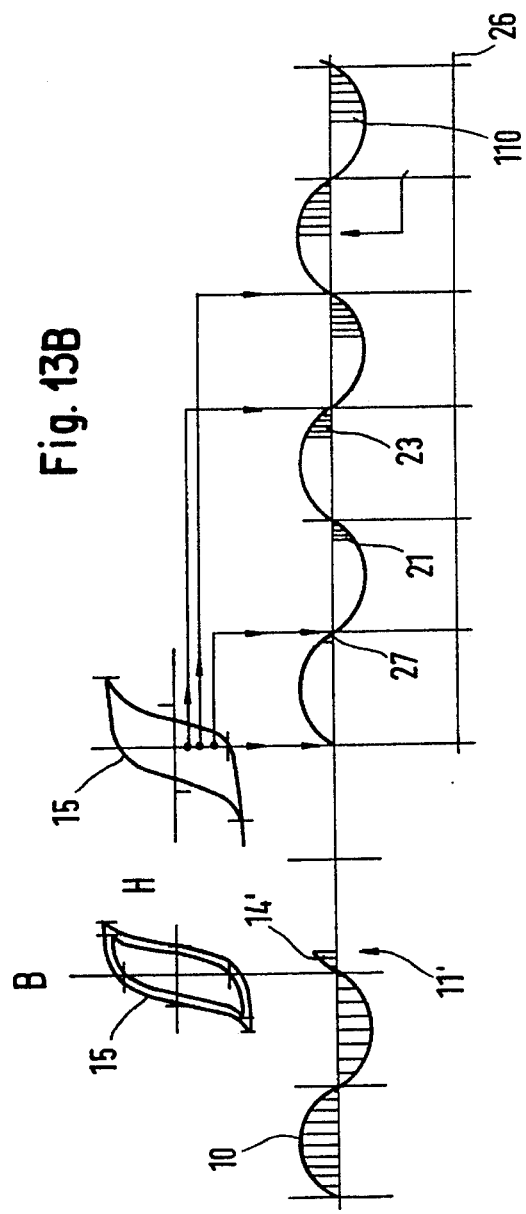

PROCESS AND DEVICE FOR REDUCING THE INRUSH CURRENT WHEN POWERING AN INDUCTIVE LOAD

The invention relates to a method of reducing the inrush current when energizing an inductive load having a magnetizable core from an a.c. power grid with an at least occasional phase segment.

When energizing inductive loads, a magnetic remanence or remanent induction remains in the magnetizable core of such loads after being turned off. Depending upon the polarity of the a.c. voltage at the turning-off moment, the magnetic remanence or remanent induction can have different polarities and also different magnitudes.

When switching on inductive loads, the state of their remanence is generally unknown. A large inrush current arises especially, for example, in transformers with high induction and small air gaps, particularly also in toroidal transformers, upon coincidence of a switching-on point which, relative to the form of the a.c. voltage, is "unmatched" to the state of the remanence. Under certain circumstances, the inrush current can be up to fifty times the rated current and results in tripping of the protective elements. These large currents arise because the magnetization is here driven well into saturation.

On these grounds one is forced to reduce the induction to such an extent that the inrush current does not exceed a predetermined threshold value even in an unfavorable situation. However, for the same rated output, this requires substantially more iron for the core of, for instance, a transformer, and makes this correspondingly large and heavy. This is very disadvantageous, particularly for transformers of high output.

In the German patent 27 46 845 known from the prior art, the angle of current flow is gradually increased during a switching-on phase in order to effect a smooth start-up. A further problem solution resides in that a full throughconnection of the a.c. switch is to be achieved after dimming from high.

It is disadvantageous here that, when the remanence at standstill and the first generated voltage signal have the same polarity, the induction of the transformer during dimming nevertheless increasingly shifts into saturation. Thus, a peak inrush current adds up over consecutive, segmented half-waves, particularly because of asymmetries in the segments of the positive and negative grid half-waves. The existing remanent polarity of, for example, a transformer, cannot be taken into account with this device so that peak inrush currents can occur here.

Peak inrush currents in an inductive load also cannot be prevented with the measures of the German patent 35 13 365 which is concerned with current limitation when switching on lamps. A similar circuit arrangement is known from the ELV Journal 45, pages 1 to 4. Here, a relatively small segment angle is initially present at the switching-on moment, i.e., a phase segment angle of 180 degrees and a correspondingly low start-up output, and this phase segment angle then shifts to 0 degrees, which represents the full output, in a typical time of 0.5 to 2 seconds after the zero intercept of each grid half-wave.

Moreover, it is known from the German Auslegeschrift 27 43 65 to switch on a transformer at a phase angle of 90 degrees or 270 degrees. However, the phase angle when switching off, and the polarity and magnitude of the respective remanence, are not considered.

The German Offenlegungsschrift 24 24 716 already shows a possibility for preventing or reducing the inrush current in transformers. To this end, the magnitude and phase of the actual remanence are measured and switching-on performed in the phase position with which the smallest inrush current is produced. To achieve this, measuring probes must be installed at one or more locations of the casing of the transformer core. However, this must already be taken into account during construction of the transformers so that this method cannot practically be used for existing, random transformers or the like.

The U.S. Pat. No. 3,925,688 and German Offenlegungsschrift 27 35 736 shows a.c. switching arrangements which cause switching-on at the zero intercept at the beginning of an a.c. voltage period and switching-off at the zero intercept at the end of an a.c. voltage period. However, this can lead to a resonant increase in the reactance current, and thus finally to an overload, particularly during the switching of pulse groups which follow one another in rapid succession. Hence, these circuits are unfavorable especially for this application although they can also cause high reactance currents when switching on once.

The European patent application 0 222 727 illustrates a device with which, depending upon the switching-off moment, the a.c. voltage can be switched on after an adjustable delay following the zero intercept. It is true that, in this manner, one is not bound to a fixed switching-off moment. Nevertheless, relatively high reactance currents still occur here when switching on and operation with rapid, consecutive pulse groups would lead to a summing of the reactance currents and, finally, to an "inrush". Furthermore, the state of the remanence here, also, cannot be determined and considered when switching on for the first time so that a large inrush current can occur.

From the German Offenlegungsschrift 25 30 047 and PCT/DE90/00272, one already knows devices with which a precise setting of the remanence is possible by means of a capacitor discharge prior to or during switching-on of the inductive load. However, this requires a relatively large expenditure due, among other things, to the capacitor or capacitors themselves, a charging device, a separate discharging switch and the like. Moreover, in larger transformers, correspondingly large capacitors, including the previously mentioned auxiliary devices, are also required.

Finally, from the U.S. Pat. No. 4,131,927, one already knows a device in which the voltage at the load is measured and a predeterminable remanence value is then considered to be achieved when the counter-EMK of the inductance as measured in the interval between two voltage pulses has a specific value. In order to apply current to the load, a thyristor connected in parallel, with a dropping resistor for current limiting, is provided in addition to the a.c. switch.

It is an object of the present invention to provide a method and a device with which the drawbacks outlined at the outset can be avoided at least to a large extent and, in particular, with which the inductive load can be connected to an a.c. grid without the occurrence of an undesired inrush current regardless of the initial state of the remanence of the inductive load. An application is also to be possible in the switching of consecutive pulse groups which are closely spaced in time, as well as for multiphase a.c. current.

To achieve this object, the invention proposes, in particular, that the effective voltage at the load be increased by enlarging the voltage half-wave segments (current flow angle) while simultaneously measuring at least the reactance current in the load circuit. The effective voltage is increased until a predetermined threshold value of the current is reached and, after the occurrence of this measured threshold value, the load is impinged by a voltage having an effective value greater than, and a polarity opposite to that of, the voltage applied before occurrence of the current threshold value. When the current remains below the current threshold value, the effective value of the voltage is increased to a desired value or to the rated value.

With this method, switching-on can be performed at an arbitrary moment, completely independent of the switching-off situation and thereby the existing state of the remanence, without the occurrence of "inrush" currents. This is achieved through a current-controlled sensing by means of small "scanning voltage pulses"—small voltage half-wave segments with correspondingly small effective value—. The effective voltage is increased until, as an "answer" from the inductive load, reactance current pulses of increasing magnitude arise. From these current pulses, or from a current pulse which exceeds a boundary value, a conclusion can be drawn, especially on the basis of the polarity of this current pulse, as to the actual switching-on state of the remanence. Finally, synchronization of the state of the remanence and the phase condition of the a.c. voltage is possible by properly increasing the effective value of the voltage as regards phase.

A variation of the method provides for the effective voltage at the load to be increased by enlarging the voltage half-wave segments while simultaneously measuring at least the reactance current in the load circuit. The effective voltage is increased until a predetermined threshold value of the current is reached and the load is switched off following the occurrence of this measured threshold value. After a pause, which can be shorter than an a.c. voltage period, the load is impinged by a voltage having the same polarity as, and an effective value less than that of, the voltage applied prior to occurrence of the current threshold value. When the current remains below the current threshold value, the effective value of the voltage is increased to a desired value or to the rated value.

In order to again arrive at a specific initial condition of the magnetization even after a pause, the segmented voltage half-wave which was present before occurrence of the current threshold value is here, in practice, repeated once more. The magnetization is thereby shifted approximately into the condition in which it found itself at the beginning of the pause.

Thereafter, as described in connection with the method of the invention, it is possible to switch on in antiphase and at an increased effective value of the voltage without the occurrence of "inrush" currents.

According to one embodiment of the invention, the effective value of the voltage can be increased at the load via unipolar dimming caused by a decrease in the phase segment angle.

Due to the unipolar dimming, the magnetization is brought stepwise, depending upon the polarity of the voltage half-waves during dimming, from the remanent induction present at standstill to one end of the magnetization curve until, in the region of saturation of the magnetic induction, the current increases. This current is then a signal that a precise terminal position of the magnetization has been reached.

If one were to switch off at this moment, a maximum remanent induction (remanence Br) would exist in the absence of current flow (field strength H=0). When switching on, this maximum remanence must then be taken into account in such a manner that an exact relationship exists between the stationary remanent induction and the associated point of the magnetization curve (B/H). This means that, upon occurrence of a somewhat larger current pulse in the vicinity of the magnetic saturation, the a.c. voltage can remain on from the voltage value present at this moment and, at the next antipolar half-wave, can continue without phase segmentation and in unison with the magnetization.

Unipolar dimming can be used, in particular, for different, varying loads and also for asymmetrical loads. It is further of advantage here that one can operate with small effective voltages and correspondingly small currents.

Another possibility for increasing the effective voltage when switching on is to apply the effective voltage to the load through bipolar dimming effected by a reduction in the phase segment angle.

In this method, the magnetization is not forcibly brought into the vicinity of the magnetic saturation. Rather, a corrective reaction here occurs only when the measured magnetization reactance current exceeds the predetermined value. However, this is only the case when the magnitude of the remanence and the polarity of the remanence, together with the associated inductive field strength value of the magnetization curve, do not precisely enough match the switching-on phase of the a.c. voltage.

A further development of the invention relates to a 3-phase a.c. grid and and a 3-phase load having three windings which are selectively connected in different vector groups. For a vector group connected in a triangle or a star, energization is initially increased in two phases by enlarging the voltage half-wave segments until the predetermined reactance current threshold value in the region of the iron saturation has been reached. These two phases are then switched on in antiphase to the voltage applied before the occurrence of the current threshold value and the third phase is switched on with a time delay relative to the two other phases. Alternatively, when the predetermined reactance current threshold value is reached, the energization is discontinued. Two phases are thereafter respectively switched on in the same polarity states as, and with a smaller current flow angle than, the voltage half-waves which the respective, preceding current pulses generated before reaching or exceeding the reactance current threshold value of the individual phases. Subsequently, the third phase is switched on with a time delay relative to the two other phases.

In this manner, 3-phase transformers can likewise be switched on "inrush-free", i.e., without the occurrence of large inrush current peaks. Here, also, a winding is initially increasingly energized until a precise magnetization has been achieved. Asymmetries are avoided by the stepped switching-on, in time, of the third phase or the two other windings. The pause in energization is provided when operating with pulse groups and can here amount to less than one a.c. voltage period.

It is advantageous when the switching-on of the two phases relative to the lagging phase occurs with a voltage half-wave segment such that this causes a reactance current pulse which lies in the region of the no-load current. The switching-on of the third phase with a time delay takes place in such a manner that the sum of the reactance currents of all three phases is approximately 0 in order to avoid asymmetries during further operation. These measures prevent the previously mentioned asymmetries which would otherwise be caused by the existing phase shifts.

For a vector group connected as a star with a neutral conductor, a first phase is initially switched on relative to the neutral conductor and, by enlarging the voltage half-wave segments, is increasingly energized until the predetermined reactance current threshold value in the vicinity of the iron saturation has been reached. This phase is then switched on in antiphase to the voltage applied before occurrence of the current threshold value and the two other phases are switched on with a time delay relative to the first phase when the sum of the reactance currents in all three phases is approximately 0 and identical currents, which are symmetrical with respect to one another, flow in all three phases. Alternatively, when one another, flow in all three phases. Alternatively, when the current threshold value is reached, energization is discontinued. The first phase is subsequently switched on in the same polarity state as, and with a smaller current flow angle than, the voltage half-wave which the preceding reactance current pulse generated prior to reaching or exceeding the reactance current threshold value. The two other phases are then switched on with a time-delay relative to the first phase. In this manner, "inrush-free" switching-on is also possible with this 3-phase vector group—star with neutral conductor—.

A further development of the invention provides that, in order to determine the voltage half-wave segments when switching-on is begun, the approximate peak value of the no-load reactance current is predetermined. The voltage half-wave segments are enlarged until the current threshold value is reached and the associated angular voltage segment is stored. In this fashion, the matching switching-on moment can be precisely determined.

For a dummy load, the reactance current portion and the operating current portion can be measured. The voltage half-wave segment is enlarged until the peak value of the reactance current pulse is about equal to the peak value of the operating current pulse and the associated value of the voltage half-wave segment is stored. This makes it further possible to achieve, if necessary, a continuous adjustment of the switching-on moment to different loads and the transformer parameters altered thereby. Another development of the invention provides that, in order to determine the load vector group which is connected to the 3-phase grid, a phase is initially impinged, relative to the neutral point, with a large phase segment angle and a correspondingly small effective voltage value and that current monitoring is performed. The 3-phase vector group of the connected load can thereby be automatically determined without external assistance.

The invention also relates to a device for limiting the inrush current of an inductive load, especially a transformer, having a magnetizable core. The device includes an a.c. switch which is arranged in series with the load and is connected with a phase segmentation control unit. This device is particularly characterized in that a current measuring device is provided at least for the reactance current flowing in the load circuit. This current measuring device, as well as the phase segmentation control unit, are connected with a sequence control unit in order to increase the effective voltage at the load and to influence the phase segmentation control unit in dependence upon the reactance current when a current threshold value occurs. Influencing of the phase segmentation control unit in dependence upon the reactance current can be in the sense of a change in the polarity of the voltage connected to the load as well as a reduction in the phase segment angle. Alternatively, when a pause, which can be shorter than an a.c. voltage period, is provided after the occurrence of a current threshold value, influencing of the phase segmentation control unit in dependence upon the reactance current can be in the sense of a repetition of a segmented voltage half-wave existing before the occurrence of the current threshold value and subsequent, antiphase voltage impingement. When the reactance current remains below the current threshold value, influencing of the phase segmentation control unit in dependence upon the reactance current is in the sense of an increase in the effective voltage to a desired value or to the rated value.

As already explained in connection with the method of the invention, a current-controlled increase in the effective voltage is thereby possible until, as a reaction to reaching a saturation region of the magnetization, a predetermined current threshold is exceeded. In this manner, a precise terminal position of the magnetization is then achieved and makes possible an exactly matching switching-on of the a.c. voltage at the load.

In an embodiment of the device, the connection of the inductive load with the grid a.c. voltage from the switching-on moment is adjustable, by means of the phase segmentation circuit, with constantly increasing current flow angle. An influencing of the phase segmentation control unit in dependence upon the reactance current when a current threshold value occurs is here in the sense of a change in the polarity of the voltage connected to the load as well as a reduction in the phase segment angle. This embodiment of the device provides for a comparator circuit which is arranged in series with the inductive load and whose output is connected with the phase segmentation circuit. When the phase segmentation circuit is impinged by a primary circuit overcurrent signal generated by the comparator circuit, it applies to the control electrode of the a.c. switch, for at least one half-wave, a triggering signal with a predetermined, remanence-setting phase segment angle. The remanence-setting phase segment angle is smaller than the segment angle which can be associated with the occurrence of the primary circuit overcurrent signal. In the phase segmentation circuit, a triggering signal can be generated at the predetermined phase segment angle during the respective half-waves which follow the remanence-setting half-waves.

A synchronized triggering voltage, which can trigger the a.c. switch of the supply voltage-buffered phase segmentation circuit, can be generated by a predetermination of the remanence-setting, switching-on phase position which takes into account the special properties of the connected load, particularly a transformer.

Through this first segment which follows an overcurrent, the remanence can be set such that the dimming operation with, if necessary, its fixed segment angle can subsequently be started.

In an advantageous embodiment of the invention, there is overcurrent and undercurrent protection in that at least one load trouble recognition circuit is provided and reliably opens the a.c. switch upon exceeding and/or falling below a desired current range. This prevents a fire danger which exists under certain circumstances, particularly with halogen lights, due to contact resistances which can arise, for example, at the junctions between braced conductors and the lamp holders customarily clamped thereto. With this overcurrent/undercurrent protection, the tentative standard specification VDE 0711, part 500 for low-voltage illuminating systems is also satisfied.

Another embodiment of the device according to the invention provides for the phase segmentation circuit to establish the connection between the inductive load and the a.c. voltage with unipolar phase segments only. Upon being impinged by a primary circuit overcurrent signal generated by the comparator circuit, the phase segmentation circuit applies to the control electrode of the a.c. switch a triggering signal of 150 degrees to 180 degrees for, in time, the immediately following half-wave of opposite polarity and the immediately next-following full wave. During each of the half-waves which follow, a triggering signal with a predetermined phase segment angle occurs in the phase segmentation circuit.

Through the use of periodically spaced, successive, unipolar, segmented half-waves whose angular value increases slowly, the inductive current supply apparatus, e.g., a transformer, is brought into a precise state of the remanence, which is known to the circuit, independent of the original switching-on phase position and state of the remanence in the transformer. After a number of segmented half-waves, which number depends upon the structure of the current supply apparatus, there is a small inrush peak current, which does not endanger the circuit and the protection, as an answer by the transformer that its remanence has been properly set. A triggering voltage can thereby be generated in the segmentation control circuit and can trigger the a.c. switch of the supply voltage-buffered phase segmentation circuit for the immediately following half-wave of opposite polarity. Normal operation of the transformer is initiated by the first full, through-going half-wave following a small overcurrent pulse. The induction characteristics at this moment correspond to those during stationary operation. After a few periods of full-wave operation, the circuit then automatically sets, if necessary, the selected phase angle for dim operation by means of a continuous transition.

Additional embodiments of the invention are set forth in the other subclaims. The invention and its important details are described more fully below with reference to the drawings.

Figure 2:
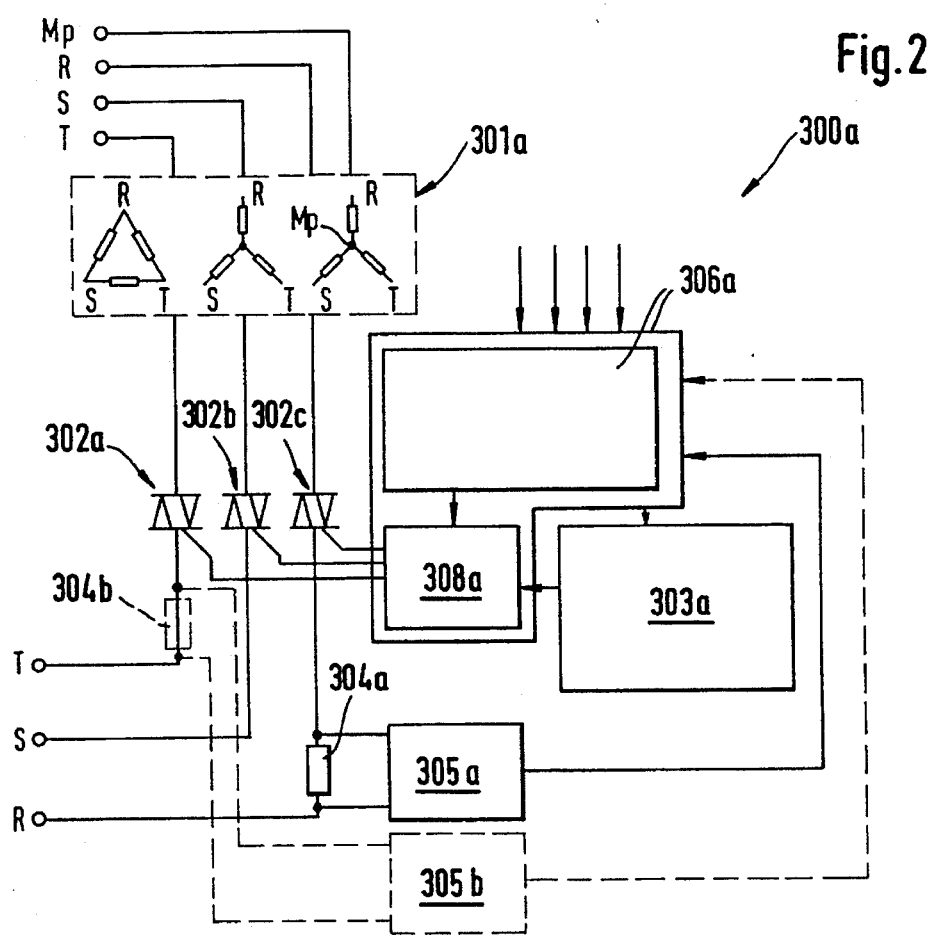
Figure 3:
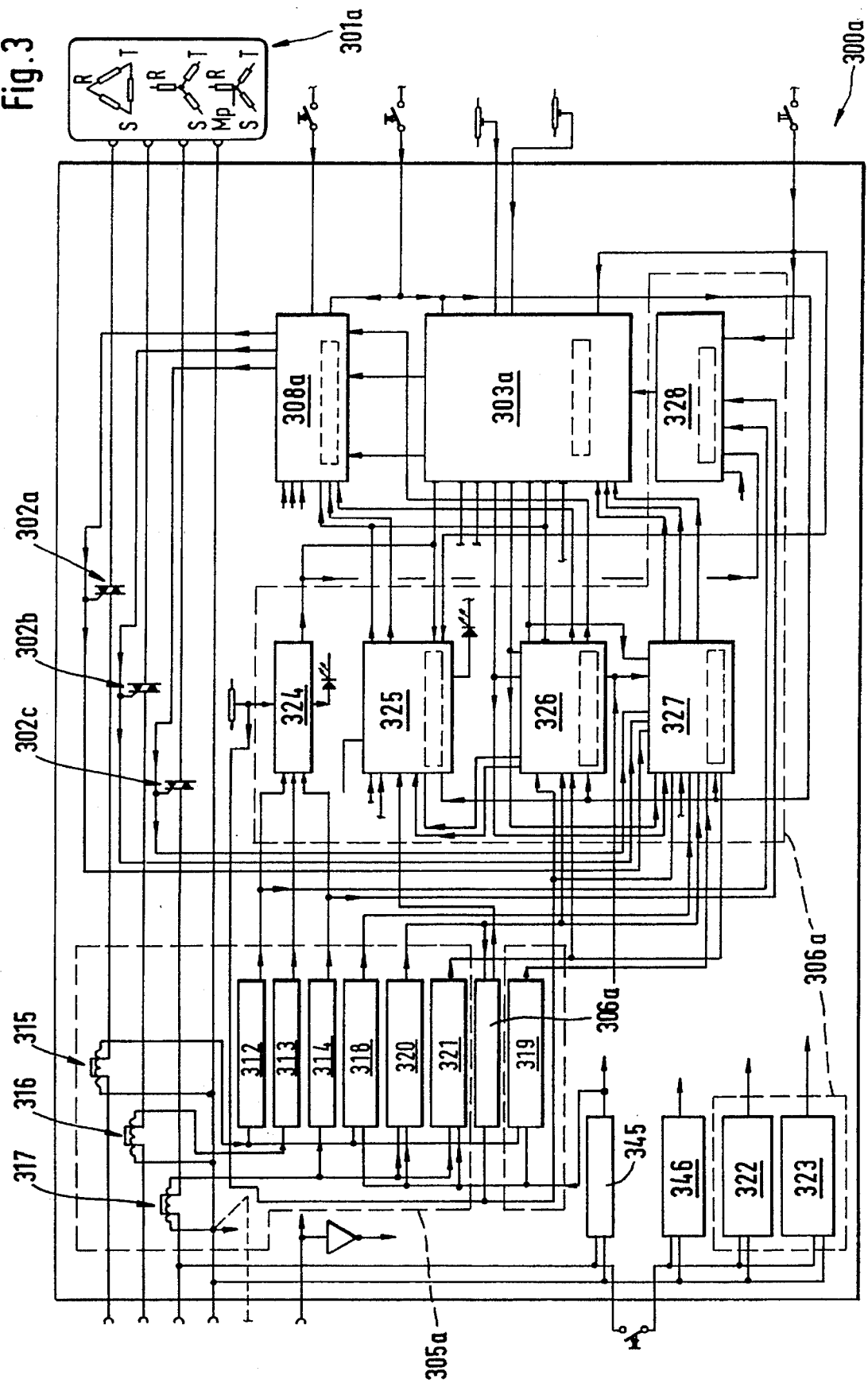
Figure 14:
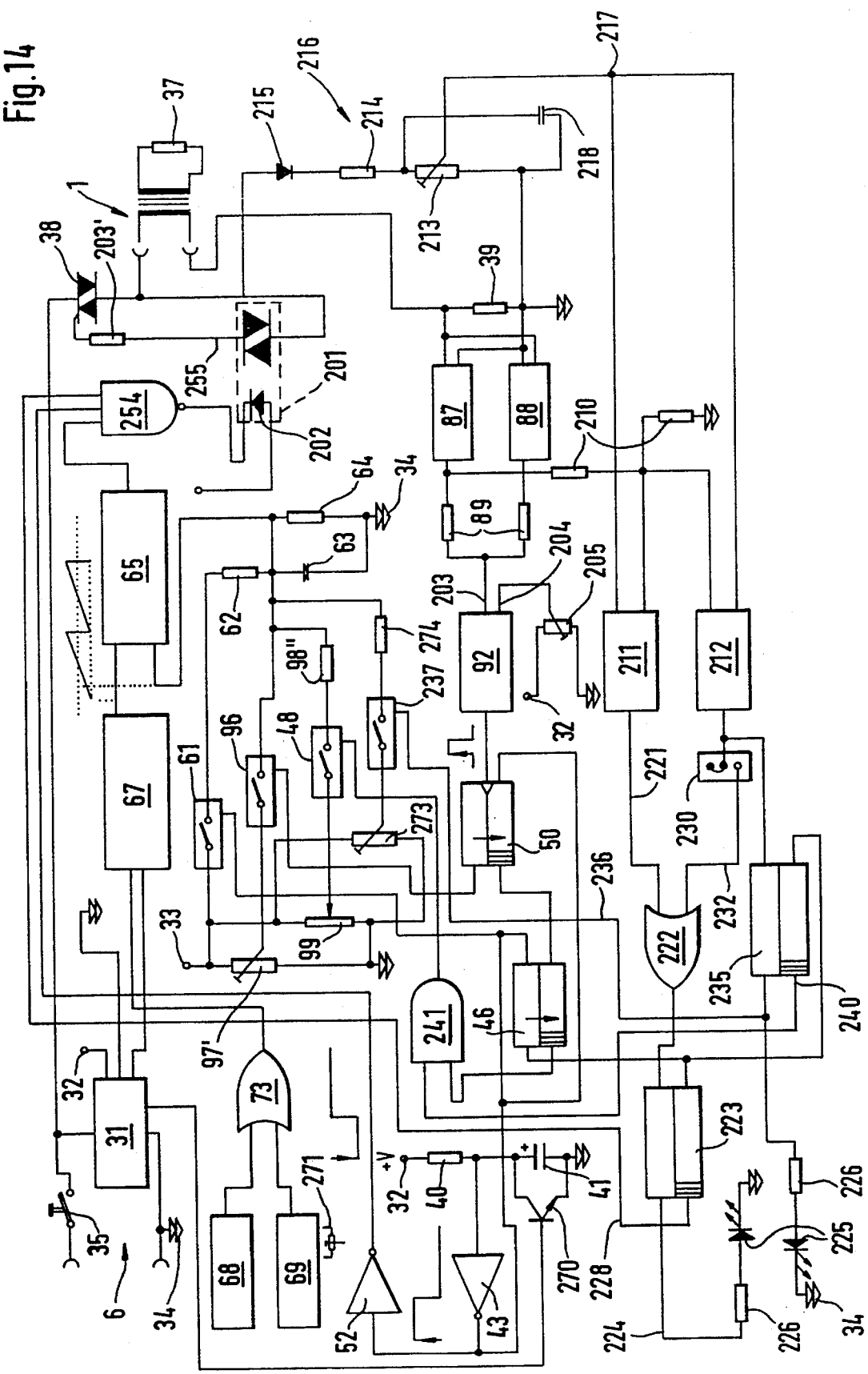
Figure 15:
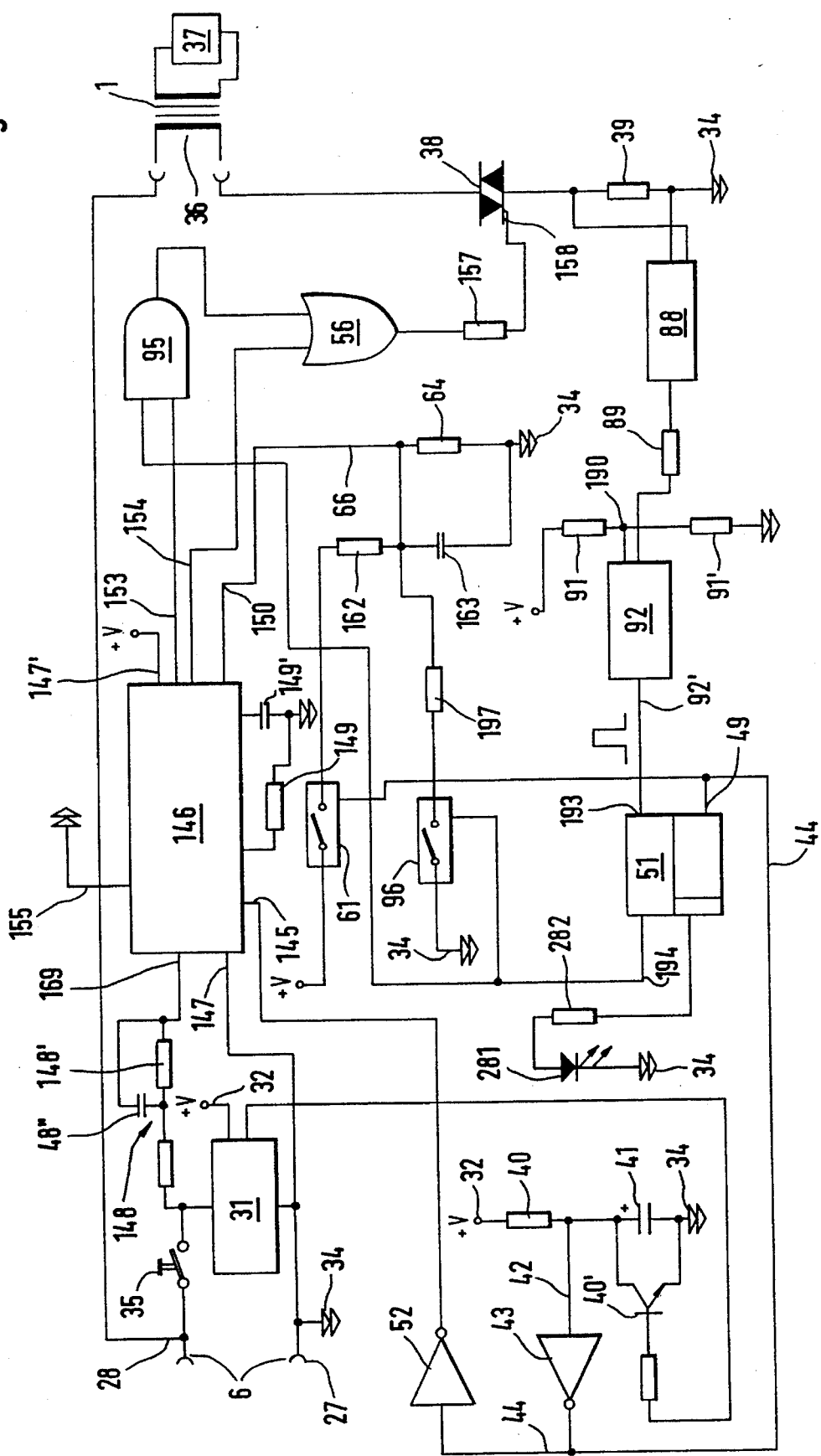
Figure 16:
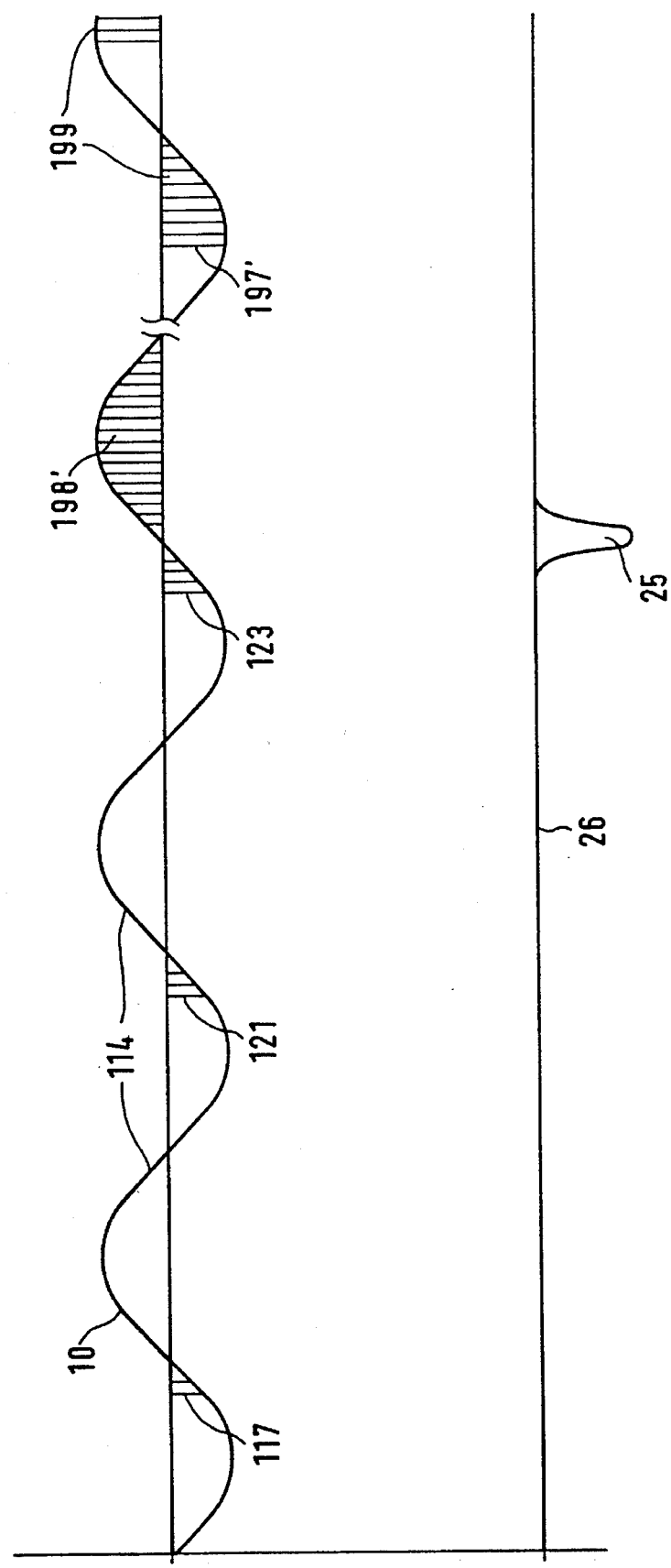

There is shown:

FIG. 1 a block circuit diagram for energizing an inductive load with a single-phase a.c. grid, FIG. 2 a block circuit diagram for energizing a 3-phase load with a 3-phase a.c. grid, FIG. 3 a block circuit diagram with a detailed illustration of the functional blocks shown in FIG. 2, FIGS. 4 to 7 internal circitry of the functional blocks shown in FIG. 3, FIGS. 8 to 10 coordinated diagrams illustrating the functional processes when energizing 3-phase loads with different vector groups, FIGS. 11A and 11B curves of the grid voltage as well as the grid current signals when switching on a transformer with a dimmer, FIGS. 12A, 12B and 12C a block circuit diagram of a device for limiting inrush current peaks on the primary side of a transformer during dim operation, FIGS. 13A and 13B curves of voltage signals and current signals during switching-on procedures for transformers with a dimmer and differing, undefined remanence of the transformer, FIG. 14 a block circuit diagram of a device for limiting inrush current peaks on the primary side of a transformer during dim operation in a further exemplary embodiment, FIG. 15 a block circuit diagram of a device for limiting inrush current peaks on the primary side of a transformer during dim operation in a modified embodiment, and FIG. 16 curves of the grid voltage as well as the grid current signals when switching on a transformer with a device according to FIG. 15.

A device 300 illustrated in FIG. 1 shows the important assemblies for energizing an inductive load 301 provided with a magnetizable core with an a.c. grid. Inrush current peaks can be avoided by means of the illustrated assemblies.

An a.c. switch 302, in the present exemplary embodiment a triac, is arranged in series with the inductive load 301 and is connected with a phase segmentation control unit 303.

In addition to the a.c. switch 302, a current measuring shunt 304 is located in the load circuit and is connected to a current measuring device 305.

Aside from the phase segmentation control unit 303 and the current measuring device 305, a run-off control unit 306 belongs to the control device for the a.c. switch 302. The run-off control unit 306 includes, among other things, a comparator 307 which essentially carries out a comparison between a current setting and the actual current measured at the current measuring shunt 305. The run-off control unit 306 further contains a triggering logic circuit 308.

In addition to the input coming from the current measuring device 305, the run-off control unit 306 has a whole series of additional control inputs which are indicated by arrows and serve, by way of example, for the entry of a start/stop signal, for the desired segment angle, if necessary for a master control unit, etc.

In the exemplary embodiment, the inductive load 301 is a transformer and the load circuit forms the primary side of the transformer. Different secondary loads—ohmic, inductive, capacitive or mixed loads—can be connected to the secondary side 309.

When an a.c. grid voltage is applied to the load circuit, the effective voltage at the load 301 formed by the primary winding 310 of the transformer is initially increased in that the voltage half-wave segments are enlarged by means of the phase segmentation control unit 303. Simultaneously, the current in the load circuit is monitored via the current measuring shunt 305 and the connected current measuring device 305. If a current threshold value determined by the run-off control unit 306 or the comparator 307 is exceeded, this is an indication that the magnetization of the transformer core is located in the saturation range. The polarity of the magnetization can be discerned from the polarity of the current pulse which occurred and it is possible to react in order to avoid a large inrush peak current. This takes place in that the effective value of the voltage is substantially increased with opposite polarity to the voltage half-wave in which the current threshold value occurred.

In particular, this is explained in more detail with reference to the diagrams according to FIGS. 12, 13 and 16.

As described in the exemplary embodiment according to FIGS. 15 and 16, the increase in the effective voltage at the load can be undertaken via unipolar dimming effected by a decrease in the phase segment angle. On the other hand, however, there also exists the possibility of increasing the effective voltage at the load via symmetrical, bipolar dimming effected through a decrease in the phase segment angle. This is described in the exemplary embodiment according to FIGS. 12 to 14.

FIG. 2 shows a device 300a by means of which a 3-phase load can be energized with a 3-phase a.c. grid. Here, also, the 3-phase load is an inductive load having a magnetizable core. It is preferably a transformer and, in particular, asymmetrical, 3-phase core transformers with three legs are used. These 3-phase transformers can be connected in different vector groups—triangle, star, star with neutral conductor—as the side-by-side alternatives in FIG. 2 indicate. The fundamental structure of the device 300a is comparable to that of the device 300 illustrated in FIG. 1. In contrast thereto, a.c. switches 302a, 302b and 302c formed by triacs or antiparallel-connected thyristors are here, however, provided in each phase (RST).

The current measuring device 305a is connected with a current measuring shunt 304a located in one of the three phases (here in phase T). Current measurement in one of the three phases suffices for inrush current limiting. In FIG. 2, still another current measuring device 305b, with an associated current measuring shunt 304b located in the phase R, is drawn in broken lines and forms part of an overcurrent protection arrangement. Current measurement in two phases suffices for such overcurrent protection in a triangular circuit and in a star circuit while, in a star circuit with a connected neutral conductor, current measurement in all three phases is required.

To avoid an undesired inrush current in the device 300a shown in FIG. 2, the 3-phase load is energized in two phases of a winding for the triangular circuit, in two phases of two windings for the star circuit and over one phase of one winding for the star-with-neutral conductor circuit. This likewise takes place initially with very low effective values of the voltage and, while simultaneously measuring the current, energization is increased by enlarging the voltage half-wave segments. When the magnetization of the transformer core is in the range of the iron saturation, the energization can be discontinued. Subsequently, two phases of the triangular circuit or star circuit without neutral conductor, or one phase of the star circuit with neutral conductor, are each switched on in the voltage polarity state which respectively existed at the time of the associated, preceding, reactance current threshold value in the individual phases. Finally, the third phase or, in a star circuit with neutral conductor, the second and third phases are switched on with a time delay relative to the phase or phases. The time delay is adjusted such that the sum of the reactance currents of all three phases during switching-on, and also thereafter, is approximately 0.

Figure 8:
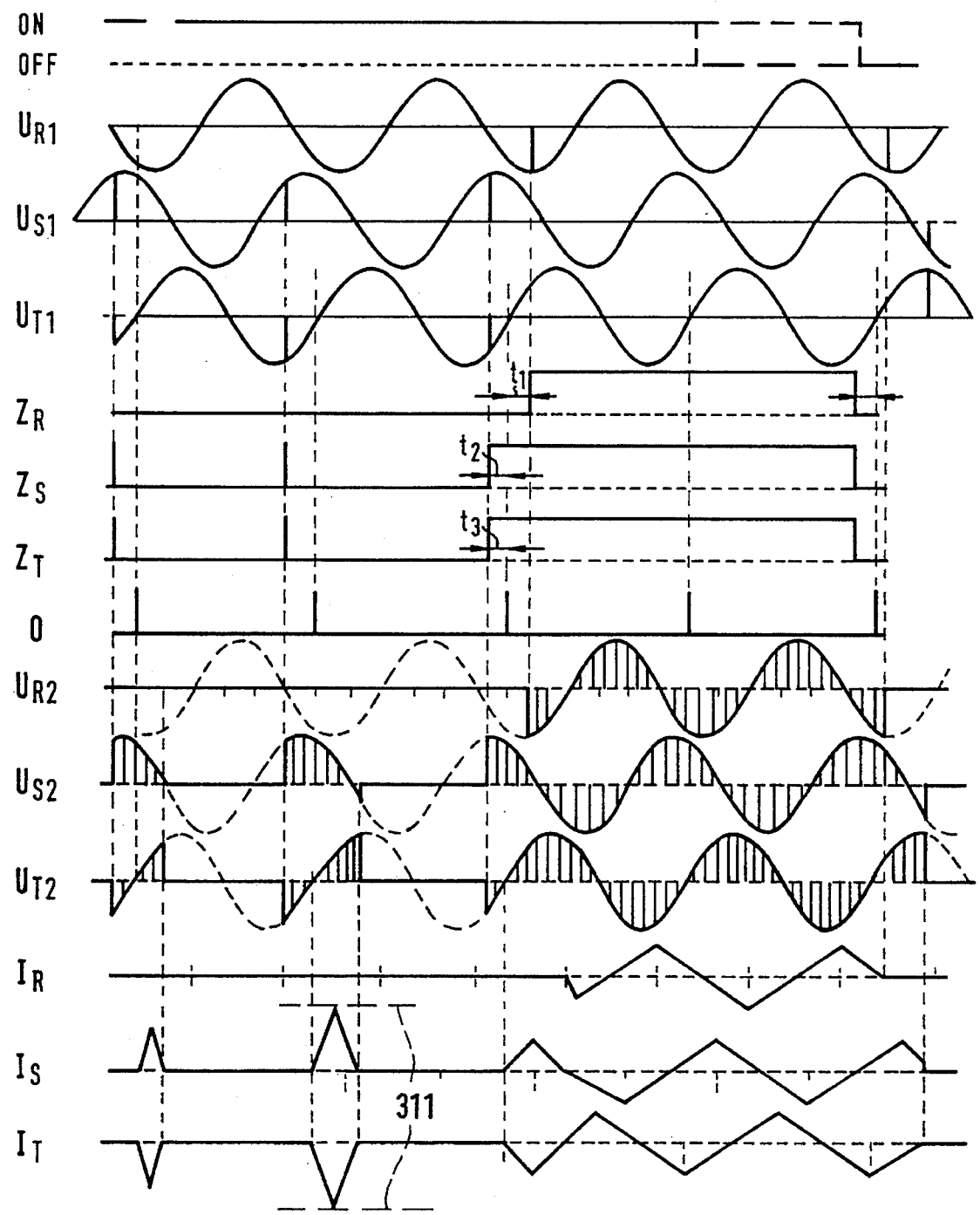

FIG. 8 shows diagrams which are correlated on a time axis (abscissa). An on-off signal is shown in the first line. The next three lines show the three phase-shifted, 3-phase, a.c. voltages in the phases R, S and T. The three lines below this show the triggering signals ZR, ZS, ZT assigned to the individual phases. The next line presents the respective times of the zero intercepts of the phase T. Three lines follow with the voltage curves of the three phase voltages controlled by the phase segmentation control unit 303a (FIG. 2). The last three lines show the currents arising in the individual phases R, S, T.

FIG. 8 shows the relationships in connection with a 3-phase load connected in a triangle.

Initially, the phases S and T of a winding of the 3-phase load are energized by means of small, growing voltage half-wave segments which, in the present exemplary embodiment, are unipolar. The voltage half-wave segments of different size present after the respective zero intercept of the voltage result from the semiconductor switch which continues to conduct until the end of the current pulses. The voltage half-wave segments respectively generated before the zero intercepts are controlling for the occurrence of the current pulses. The phase currents IS and IT arising with each segmented voltage half-wave can be seen in the last two lines of FIG. 8. Since the 3-phase load is energized by means of the two phases S and T of a winding, the respective current pulses which arise are, of necessity, equally large and antipolar. If now a predetermined current threshold value 311 (compare the last two lines in FIG. 8) is reached, energization in the present case is briefly interrupted. Subsequently, the two phases S and T are again switched on in the polarity state which the respective current pulses had upon reaching or exceeding the reactance current threshold value 311. This polarity state of the switched-on voltage segments then also corresponds to the polarity state of the voltage half-wave segments which preceded, and were present during the generation of, the current pulses.

The associated voltage half-wave segment angle is somewhat larger—corresponding to a smaller current flow angle—when switching on the two phases S and T because, for clarity, the current threshold value 311 lies above the maximum reactance current value occurring at the greatest induction. The greatest induction is present at the turning points of the magnetization curve, respectively. Since, for the preceding reasons, the current threshold value 311 already lies somewhat outside of these magnetization curve turning points, and thus in the saturation range, the current flow angle is reduced somewhat when switching on the two phases S and T so that, as closely as possible to one of the turning points of the magnetization curve, one actually initiates a current flow which is "synchronized" with the same. As already mentioned above, the third phase R is switched on at some moment such that the sum of the reactance currents of the individual switched-on phases is approximately during further operation.

In principle, it is possible to switch off at an arbitrary moment because, by virtue of the method of the invention, the state of the remanence need not be known.

However, when energizing the 3-phase transformer with pulse groups, especially where the time intervals between the individual pulse groups are short, it is advantageous to switch off at a precise state of magnetization. Correspondingly, it is then possible, knowing the switching-off moment, to directly switch on again at a specific moment without "sensing" for a precise state of magnetization. Hence, no inrush current peaks occur at the beginnings of the respective pulse groups so that the individual pulse groups can lie very close to one another.

In the exemplary embodiment according to FIG. 8, the phase T has been selected as the reference phase and its zero intercept serves as a characteristic value. The zero intercept where the current in the phase T goes from minus to plus is here used to obtain a switching-off moment which is matched to the contemplated switching-on moment. The voltage curves of the individual phases then have the same positions as after the "remanence-setting" where the current threshold value occurred.

Experiments on a specific transformer in a triangular circuit have shown that the two phases which are to be switched on first—here the phases S and T—are switched on approximately three milliseconds (t2, t3) before the zero intercept of the reference phase. The third phase is switched on approximately three milliseconds (t1) after the zero intercept of the reference phase. These delay times t1 to t3 are illustrated in lines 5 to 7 (ZR,ZS,ZT).

Figure 9:
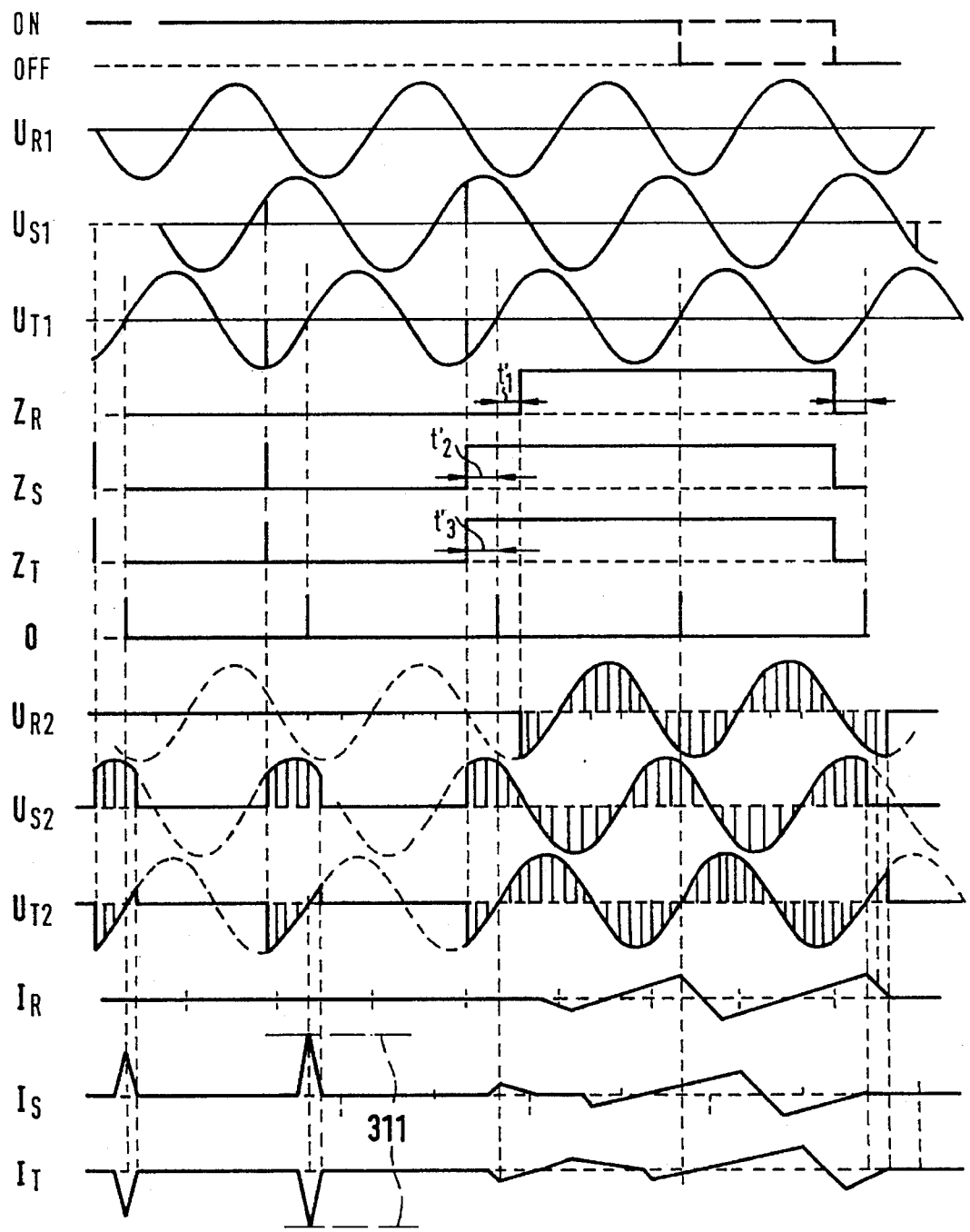
Figure 10:
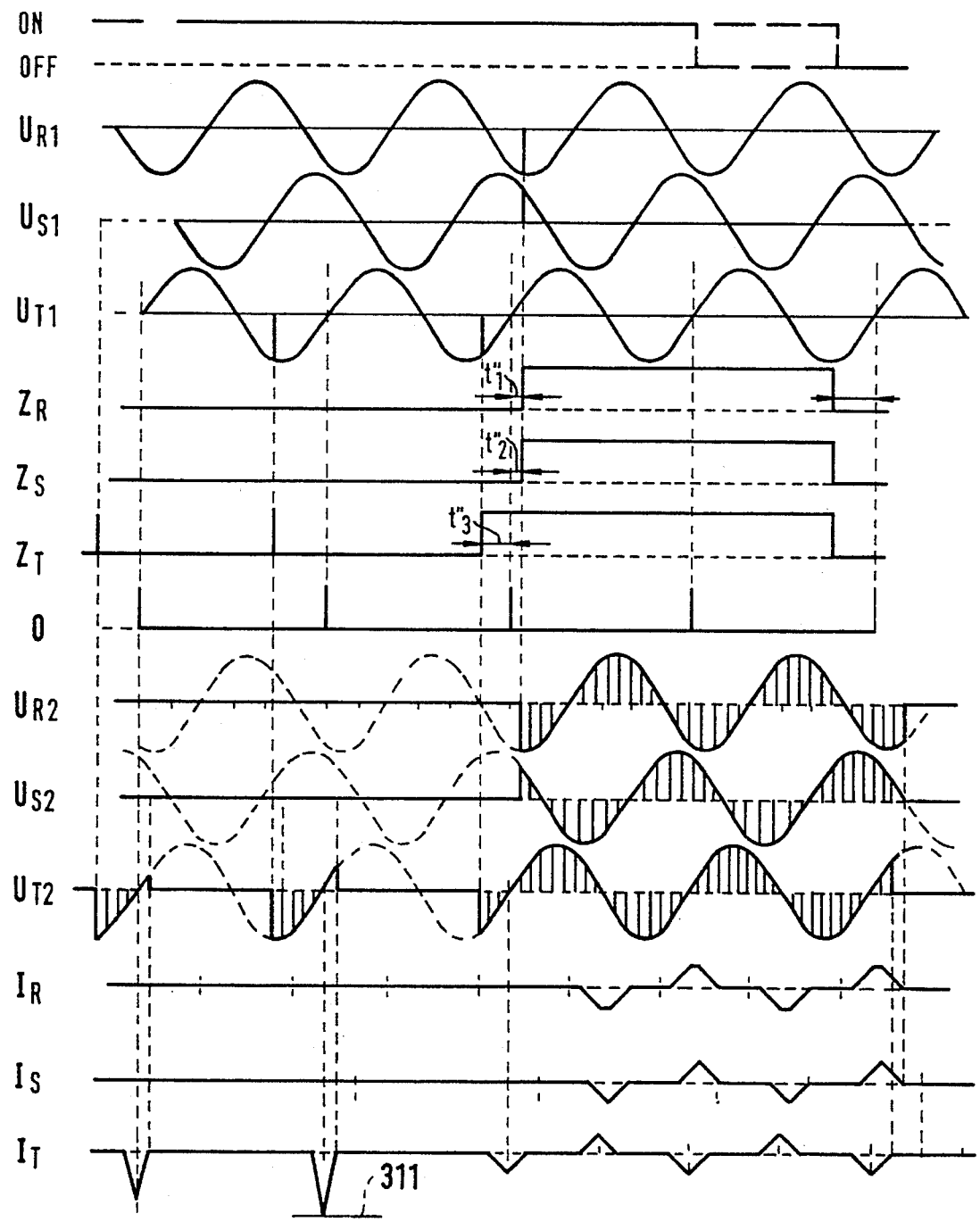

The pauses in energization provided in FIG. 8, and also in FIGS. 9 and 10, in the interval between the first energization and the occurrence of a current threshold value, as well as during the actual switching-on, are here presented for clarity and are not absolutely necessary. Correspondingly, the two segmented voltage half-waves of the phases S and T in FIGS. 8 and 9, which are necessary for generation of the threshold value, can adjoin antiphase, continuous, through-going voltage half-waves which, however, have a higher effective value. If, nevertheless, an energization pause is provided as here, it is necessary, in accordance with the then-existing, maximum state of the remanence to begin the energization at a turning point of the magnetization curve which is matched to the corresponding, maximum remanence point. Accordingly, the starting points of the individual voltage curves are shifted forward relative to the previous end point.

FIG. 9 shows a correlation diagram for a 3-phase load connected in a star. In principle, the same relationships are present as for the triangular circuit, which forms the basis of FIG. 8, with the slight difference that here, due to the star circuit, tow windings arranged in series are energized when two phases are switched on. Correspondingly, smaller phase currents occur here also. The switching-on times of the individual phases, relative to the zero intercept of the phase T which is here also the reference phase, are somewhat different than for the triangular circuit. A favorable value for t1' has been found to be 2.7 milliseconds, for t2' 3.5 milliseconds and for t3' likewise 3.5 milliseconds.

Here, also, the third phase—in the exemplary embodiment the phase R—is connected with a time delay relative to the two other phases S and T and at a moment such that the sum of the reactance currents in all three phases is approximately 0 during further operation.

FIG. 10, finally, shows a diagram which is comparable to FIGS. 8 and 9 and is based on a star circuit with neutral conductor. In this case, a first phase is initially switched on with respect to the neutral conductor and here, also, increasing energization occurs by enlargement of the voltage half-wave segments until the predetermined reactance current threshold value in the region of the iron saturation is reached. Following the occurrence of this current threshold value, this first phase can be switched on fully and the two other phases are then connected when the sum of the reactance currents of all three phases here, also, is approximately 0. A suitable delay between the switching-on of the first phase and the connection of the two other phases can be approximately 1.5 milliseconds (t1" and t2"). If, as illustrated in the diagram of FIG. 10, one switches off after the remanence-setting, that is, the increasing energization until a current threshold value is obtained, the initially energized phase does not start at the switching-off moment but somewhat shifted back. A time interval t3" of approximately 4.5 milliseconds to the zero intercept of the reference phase T has been found to be favorable. Here, also, the switching-on of this first phase is shifted forward so as to have a correlation between the static value of the existing maximum remanence and the associated magnetization turning point.

The approximate peak value of the no-load reactance current can be predetermined in order to ascertain the voltage half-wave segment at the start of switching-on. The associated voltage segment angle can then be stored and is then available upon the respective switching-on.

The switching-on times or delay times when switching on the individual phases are adjustment values which depend upon the transformer type, the vector group and also whether the transformer is energized at no load or under load, or under variable load. When energizing with a constant load, the adjustment stays the same and can remain after being set once.

There is also the possibility, however, of an automatic adjustment. To this end, since the transformer with its secondary load represents a dummy load, the reactance current portion and the operating current portion are measured and the voltage half-wave segment is enlarged until the peak value of the reactance current pulse is approximately equal to the peak value of the operating current pulse. The associated voltage half-wave segment value is then that which is suitable for this load condition. The voltage half-wave segment can be continuously corrected during operation (for example, with pulse groups) via an automatic setting device and matched to the occasionally varying load conditions. Undesired inrush currents are thereby reliably prevented.

In the 3-phase design, the device of the invention can also be equipped with a vector group detection device having a follow-up control unit for energizing the individual phases at different times. If now, initially, a phase is impinged with a large phase segment angle and a correspondingly small effective value of the voltage while monitoring current, then, in the event that no current flows, it can be concluded that a triangular circuit or a star circuit without neutral conductor is present here. Two phases are then energized subsequently and, from the current flow which establishes itself, it can be determined whether a triangular circuit is present (with greater current flow) or a star circuit wherein a reduced current would flow relative to the triangular circuit because of the series connection of two windings.

FIG. 3, in a somewhat more detailed form relative to FIG. 2, shows a block circuit diagram wherein the four functional blocks also illustrated in FIG. 2 are visible. Auxiliary blocks belonging to one of these functional blocks are encompassed by broken-line borders. Here, also, the run-off control unit 306a, the phase segmentation control unit 303a, the triggering logic circuit 308a and the current measuring device 305a can be seen. The current measuring device 305a contains three current amplifiers 312 to 314 for the three phases R, S, T. Current transformers 315 to 317 in the individual phases R, S and T are connected to these current transformers. In addition to the current amplifier 312, a reactance current measuring device 318 and an operating current measuring device 319 are still connected to the current transformer 315. Aside from the current amplifier 314, a reactance current measuring device 320 and an operating current measuring device 321 are also still connected to the current transformer 317.

The blocks 322 to 328 belong to the run-off control unit 306a. A grid switching-on pulse is generated in the block 322. The block 323 contains an undervoltage detection unit. Switching-off occurs therewith when an undervoltage exists or individual half-waves are missing.

The block 324 contains an overcurrent detection unit. This is connected with a pulse pause generating block 328. When there is an overcurrent during pulse group operation, the pause between individual pulse groups is influenced by the magnitude of the overcurrent in that the pulse pauses are increased with increasing overcurrent.

Figure 4:
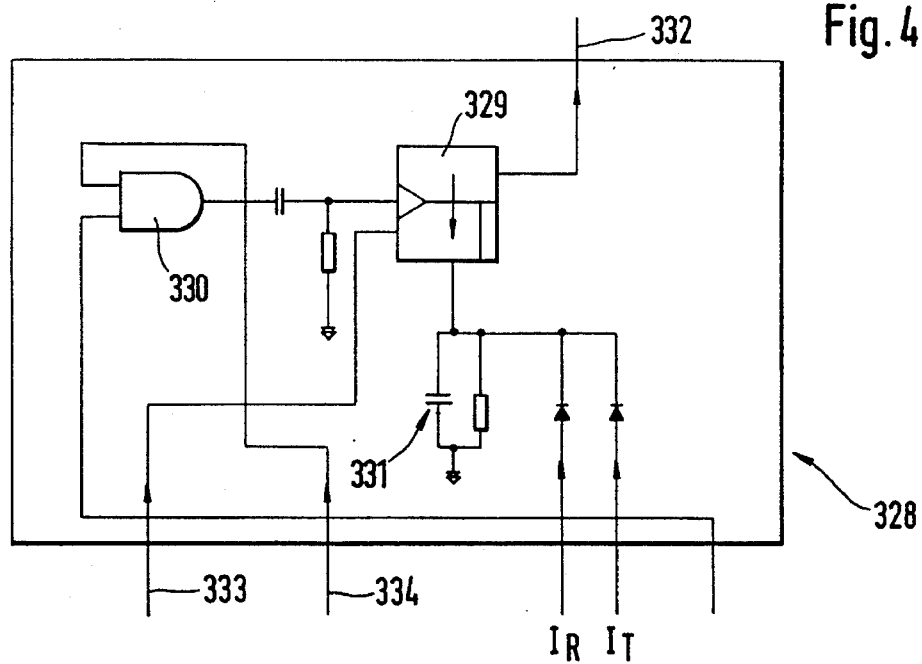
Figure 5:
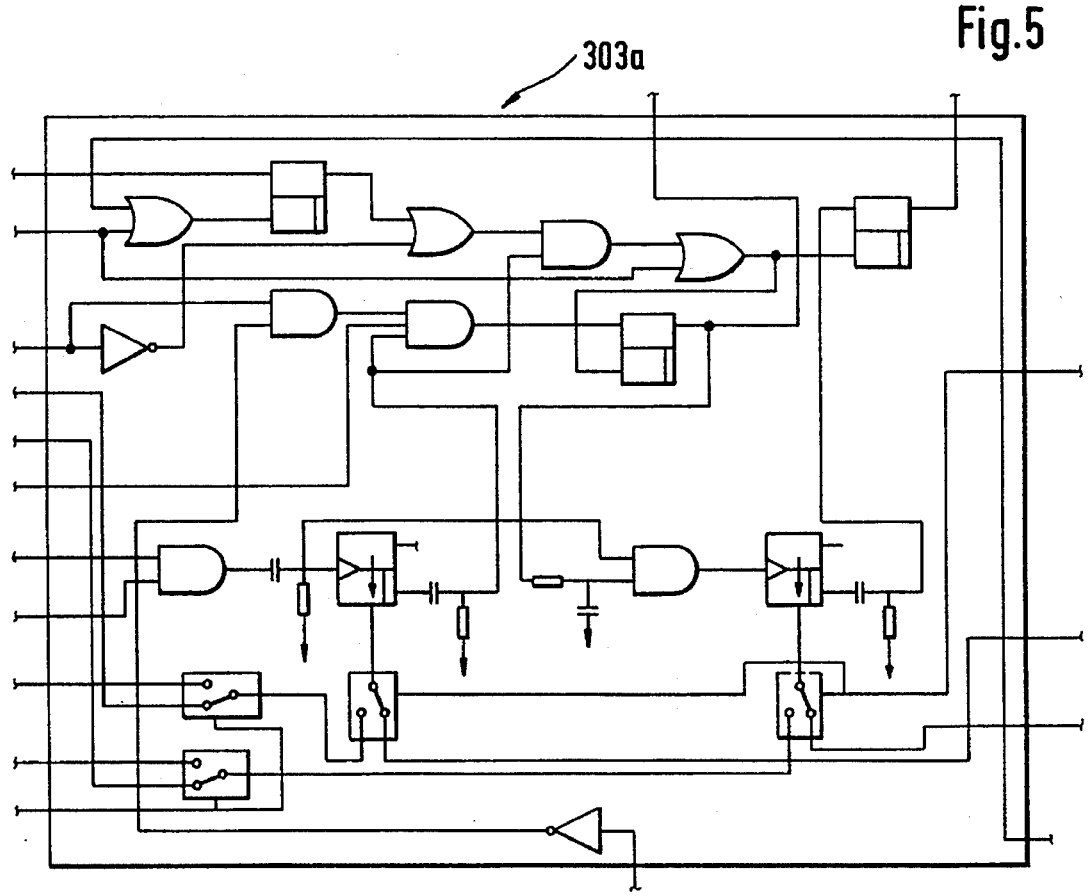

FIG. 4 shows the circuit contained in the block 328. In essence, it has a time-variable, controllable monoflop 329 as well as an AND-gate 330. A capacitor 331 is connected to the monoflop 329 and, in dependence upon the overcurrent, is charged to an appropriate voltage proportional to the overcurrent via the junctions IR and IT. The time lapse of the monoflop 329 depends upon this voltage and the monoflop correspondingly delivers at its output 332 a signal which determines the pause between consecutive pulse groups and is proportional to the magnitude of the overcurrent. To activate this device, a grid switching-on signal can be applied to the input 333 and an overcurrent switching-on signal to the input 334.

Figure 7:
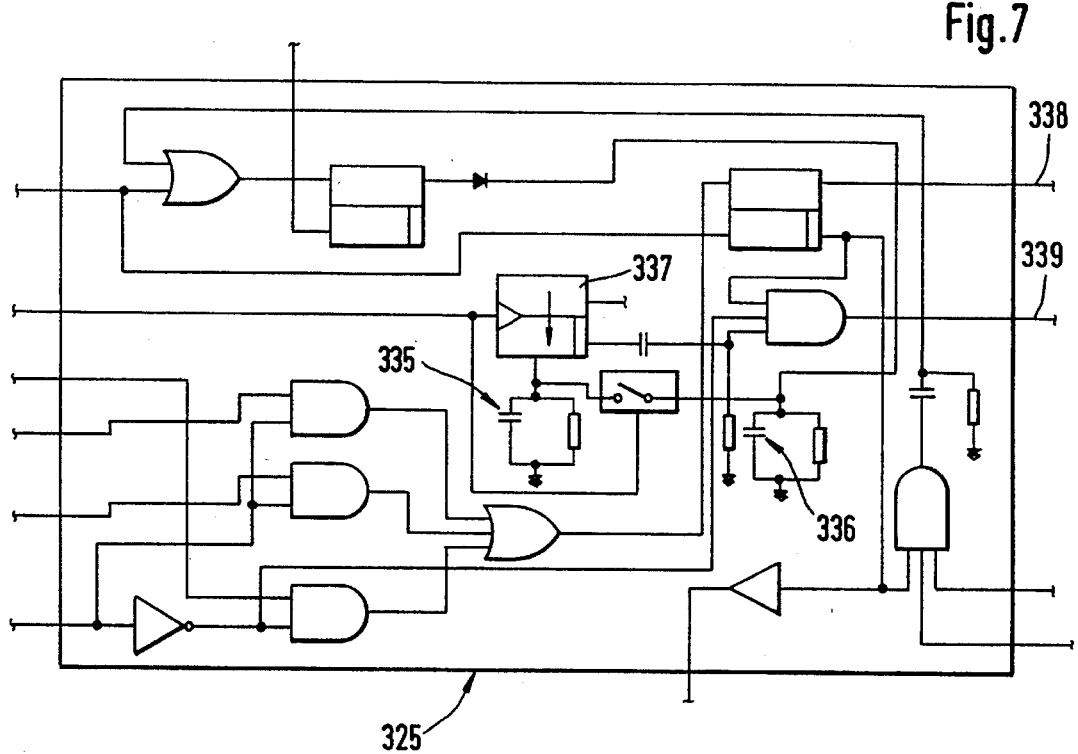

The functional block identified by 325 in FIG. 3 likewise belongs to the run-off control unit 306a. The internal circuit of this block 325 is shown in FIG. 7. When operating with manual adjustment, this block 325 controls the setting of the remanence and, to this end, generates the triggering signals for energization of the reference phase, in the present case for the phase T. With each zero intercept of the phase T, a capacitor 335, which controls the delay in triggering signal generation for the increasing effective value of the voltage, is charged anew to the voltage of the capacitor 336 whose voltage follows a voltage slope which falls from the start of switching-on. Consequently, the delay time of the monoflop 337 becomes ever shorter and the phase segment of the phase T thus becomes ever larger. When the information that the remanence has been set is supplied through the input 338, remanence-setting pulses are no longer generated via the output 339.

The remaining components are connecting members for processing various input signals necessary for the functional sequence.

The functional block 326 serves for a first automatic adjustment of the device and a vector group test is performed initially. Here, as already explained, a determined is made as to which vector groups are connected.

Subsequently, it is established through the run-off control unit whether no-load operation or operation under load exists. This is determined in that a measurement of the operating current and a measurement of the reactance current are performed. Depending upon the result of the measurements, a conclusion can be drawn as to whether no-load operation (essentially only reactance current) or operation under load (with operating current) exists.

Finally, it is also checked through the functional sequence whether operation with manual adjustment is provided or not.

The functional block 327 is provided for a continuous, automatic adjustment of the optimum triggering moment to achieve the optimum phase segment angle at the switching-on moment. Here, the operating currents and also the reactance currents are measured. When no operating currents occur in the phases, no-load operation exists. In no-load operation, a polarity-dependent check is made as to whether the reactance currents are 10% larger than the closed-circuit currents. During operation under load, a polarity-dependent check is made as to whether the reactance currents are 10% larger than the operating currents. If excesses are registered during the respective comparisons, a control signal to reduce the deviation is issued. Continuous automatic adjustment is provided, in particular, for pulse group operation with variable dummy load. The reactance current is continuously measured here and, upon exceeding a predetermined value, especially the instantaneous value of the operating current, the current flow angle of the respective first voltage half-wave to be turned on is reduced when the polarity of the latter is the same as the polarity of the reactance current pulse. The current flow angle is increased for opposite polarities.

It is still mentioned that the functional blocks 326 and 327 contain microcontrollers for the previously described functions.

The functional block 324 of the run-off control unit 306a also contains an overcurrent detection unit.

Figure 6:
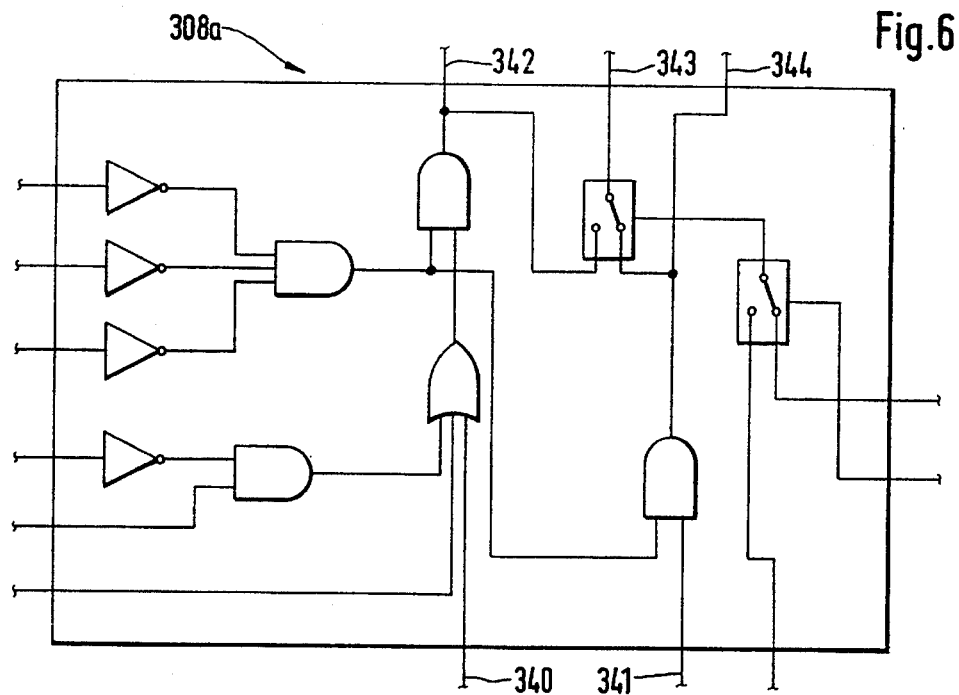

The triggering logic circuit 308a has the task of transmitting or blocking triggering signals depending upon the vector group provided. As can be seen in FIG. 6, this functional block has triggering signal inputs 340 and 341 which are connected with the phase segmentation control unit 303a (FIG. 3). The outputs 342 to 344 are the triggering signal outputs which lead to the starting electrodes of the a.c. switches 302a, 302b and 302c (compare FIGS. 2 and 3).

Input signals for the functional conditions are present at the remaining connections of the functional block 308.

The functional block 303a forms the entire phase segmentation control unit and serves to generate the triggering signals. This occurs in dependence upon manually adjusted parameters or in dependence upon automatically adjusted parameters. In addition, this functional block also contains an overcurrent inhibiting unit. A possible circuit for the phase segmentation unit 303a is reproduced in FIG. 5.

A grid synchronizing block 345 (FIG. 3) also belongs to the phase segmentation unit 303a. A grid component is identified at 346.

FIG. 11 shows the variations of the grid voltage 10 and the primary-side current 26 when switching on a transformer 1 with a dimmer 2. The transformer 1 represents a possible inductive load which can, for example, also be formed by an inductive load.

The dimmer 2 has a ramp circuit which is illustrated in diagram 3 and through which the voltage 5 is increased from a value of 0 to a predetermined desired value in the time 4. Such known dimmer circuits are used with transformers 1, particularly with low-voltage halogen illuminating devices, where a grid voltage of, for instance, 220 volts, is transformed by the transformer 1 to 24 volts, for example, on the secondary side.

The dimmer 2 is normally connected in series with, for example, a 1.6 amp, delayed-action protective unit 7 and the transformer 1. A current measuring device 8 is connected in series to measure the measuring curves illustrated in FIGS. 11 and 13 and a voltage measuring device 9 detects the alternating grid voltage or the transformer voltage on the primary side.

The sinusoidal curve shows the alternating grid voltage 10, and the latter is switched off at a random moment 11 which, in particular, can also not coincide with the end of a half-wave. The shading between the abscissa and the curve 10 in FIG. 11 means that the grid voltage has been detected by the grid voltage device 9 and thus is applied to the primary-side winding of the transformer 1.

Following the random moment 1 at which the grid voltage is switched off, the transformer 1 is switched on before the end of the positive half-wave 14 of the grid voltage beginning at the moment 13.

The hysteresis curve 15 of the transformer 1, i.e., the induction-field strength diagram, has a point 16 which is shown by the remanence resulting from the switching off 11. In the situation illustrated in FIG. 11, the transformer 1 has a positive remanence 16. In the switched-on half-wave 14, the ramp circuit in the dimmer 2 applies a small segment angle 17 to the transformer 1. The segment angle 17 is located before the transition of the positive half-wave 14 into the negative half-wave 18. Consequently, the remanence 16 of the transformer 1 is shifted farther into the positive saturation 19 so that a small inrush peak current 20 occurs. Due to the segment angle 21 which occurs in the negative half-wave 18 and is somewhat larger than the segment angle 17, the remanence is shifted back to the point 22 of the hysteresis curve 15. The segment angle 23 in the next positive half-wave 14' which further increases in angular value and thereby has an unsymmetrical sum drives the transformer 1 to the saturation of the remanence 24 during the next positive half-wave 14' so that a large inrush or inrush peak current 25 occurs. Following two additional half-waves 18' and 14", an excess of positive phase segment angle again exists from the sum of the angles 21' and 23' so that a still larger inrush 25' occurs and destroys the protective unit 7 of the transformer. This blowing of the protective unit occurs in a transformer 1 with or without a connected load.

FIG. 12 shows a circuit according to an exemplary embodiment of the invention for preventing inrush peaks 25 upon switching on a current supplying device with a fixed, predetermined segment angle, for example, when dimming a low-voltage halogen illuminating system. The grid voltage 6 supplies a grid component 31 which makes the positive operating 32 and the negative operating voltage 33 available to the circuit illustrated in FIG. 12. A plug 27 is connected with the circuit ground 34 while the other plug 28 leads, via a grid switch 35, to the primary winding 36 of the transformer 1 which has a load 37 connected to its secondary side.

The second primary-side plug of the transformer 1 is connected to the circuit ground 34 by way of an a.c. switch 38 in the form of a triac, which can also be replaced by two thyristors, and a measuring shunt 39 which, for instance, has a value of 0.1 ohm. The positive supply voltage 32 generated by the grid component 31 charges a capacitor 41 relative to the circuit ground 34 via a resistor 40.

Accordingly, a level 0-signal, which is converted to a grid 1-signal 44 by means of an inverter 43, is applied to the conductor 42 during the charging time for the capacitor 41. The grid 1-signal is applied to the setting input of a delaying member 46 whose inverting output 47 impinges a desired value switch 48. The delaying member 46 is preset, for instance, to a delay time of 2 seconds so that the dimming, desired value switch 48 remains open for the first two seconds following the switching-on of the grid voltage. The grid 1-signal 44 simultaneously impinges the reset input 49 of a further delaying member 50.

The grid 1-signal 44 is inverted by an inverter 52 so that a level 0-signal is applied, via a line 53, to an input of an AND-gate 54 for the first tenths of a second after grid switching-on. Consequently, the triac 38, which is connected with the output of the AND-gate 54 by means of a control line 55, is not triggerable for the first tenths of a second after switching on the grid component.

The grid 1-signal 44 further impinges a setting switch 61 one of whose switching contacts is connected with the positive supply voltage 32. The other contact is connected with circuit ground 34 by way of a charging resistor 62 and a capacitor 63. The setting switch 61 which closes for a period of, for instance, 0.1 second grid 1-signal, charges the capacitor 63 via the charging resistor 62, and the charging capacitor 63 thereafter again discharges via the discharging resistor 64. The time constant of the RC member 63,64 is, for example, approximately two seconds. Accordingly, a positive voltage is applied to an analog comparator 65 over the line 66 shortly after switching on the grid component 31.

The other input of the analog comparator 65 is connected with the output of a sawtooth generator 67 which is started by means of two grid zero intercept detection circuits 68 and 69.

The positive grid zero intercept detection circuit 68 delivers a needle pulse 71 at positive zero intercepts of the grid voltage and the negative zero intercept detection circuit 69 generates needle pulses 72 at negative intercepts of the alternating grid voltage 10. The needle pulses 71 and 72 are impressed on an OR-gate 73 so that, at each zero intercept of the alternating grid voltage 10, needle pulses occur at the control input of the sawtooth generator 67 by way of the line 74.

The time variation of the alternating grid voltage 10 over several periods is plotted on the abscissa 80 The needle pulses 71 and 72 lie about the zero intercepts of the alternating grid voltage 10. The output signal 81 of the sawtooth generator has a positive slope which goes from a voltage value of 0 volt at the beginning of the inclination to a predetermined maximum voltage 82 at which it is again set back by the next zero intercept of the alternating grid voltage. The capacitor voltage signal in the line 66 falls slightly over several periods, and its voltage reaches approximately one-third of the initial value after about two seconds or one hundred alternating grid voltage periods.

The voltage of the capacitor 63 is compared with the respective voltage of the slope 81 of the sawtooth generator 67 in the analog comparator 65. If the voltage of the sawtooth generator 67 is greater, a level 1-signal 83 is produced which, with the inverted grid 1-signal in the line 53, leads to a triggering signal in the AND-gate 54 and the line 55 for the triac 38 following the switching-on delay. Thus, a steadily growing segment 84, 85 and 86 occurs before each zero intercept of the alternating grid voltage. After the voltage 10 has fallen to 0 at the zero intercept of the alternating grid voltage, the triac 38 blocks until the next triggering signal.

Since the capacitor 63 discharges via the discharging resistor 64, the voltage falls over time and the segment angle 84, 85 and 86 becomes larger. After an uneven number of zero intercepts, i.e., after a segment 84,86 or, in intervals of time, a respective additional full wave, this results in a small inrush or inrush peak current 20 per FIG. 1 or 107 per FIG. 12 which is detectable in the positive current transformer 87 or in the negative current transformer 88 by means of a voltage measurement across the measuring shunt 39.

The outputs of the current transformers 87 and 88 are connected, via respective resistors 89, to a virtual zero point 90 which is connected to the negative operating voltage 33 by means of an offset resistor 91. As a result, an analog comparator 92 connected to the virtual zero point 90 receives a positive signal only when the positive current transformer or the negative current transformer issues a sufficiently large signal. This depends upon the resistor 91. The signal impinging the analog comparator 92 preferably exceeds the level 0 at 1.5 times the rated current 26 in the primary circuit of the transformer 1.

This situation is depicted by the illustrated, small inrush peak current 107 in FIG. 12. Thus, in this case, a level 1-signal 93 is transmitted to the delaying member 50 and, after an intervening charge of the capacitor 41 and the resulting level 0-signal, can be applied to the input 49. The delaying member 50 thereupon shifts the setting switch 96 to a conductive state for approximately one-tenth of a second so that the timing member runs. One contact of the remanence-setting switch 96 is connected to a potentiometer 97',98 which is arranged between the positive operating voltage 32 and the circuit ground 34. This low-resistance potentiometer 97', whose output voltage value can be fixed in advance, sets the voltage of the capacitor 63, which is connected to the other contact of the remanence-setting switch 96, to a predetermined voltage characterized by the curve segment 97 of the voltage curve of the capacitor 63. A delay time of 0.002 second is normally sufficient for this discharge of the capacitor.

A large segment angle 198 which, in the illustration shown in FIG. 12 spans approximately 135 degrees, is accordingly produced at the next incline 81' of the sawtooth generator 67. The segment angle 198 always lies in the angular range of 90 degrees to 180 degrees with the latter value corresponding to a full, negative half-wave. Due to this segment angle which is predetermined by the voltage value of the potentiometer 97',98, the remanence of the transformer 1 in the hysteresis curve 15 is precisely set so that, subsequent thereto, the desired value switch 48 can be opened for dimming operation. This can take place immediately but is advantageously done after 0.1 second following the running-down of the delaying member 50.

The desired value switch 48 is connected in series with the capacitor 63 via a resistor 98" and includes a potentiometer 99 which can be adjusted by the operator. By means of the potentiometer 99, the voltage of the capacitor 63 can be set between the positive supply voltage 32 and the circuit ground 34 so that a plateau range 100 determined by the operator is produced in the voltage of the capacitor 63. Hence, in the following half-wave, the same predetermined and symmetrical segment angle 110 is always used and leads to the desired, dimmed condition of the transformer 1 and the load connected to the same. Through the use of the resistor 98", the new desired dim value can establish itself slowly and thereby produce no new inrush.

For better illustration of the remanence-setting procedures, a hysteresis curve 15 is shown in FIG. 12. The remanence points 105, 106, 107 and 108, which are correlated to the remanence of the transformer 1 at corresponding zero intercepts 105, 106, 107 and 108 of the alternating grid voltage 6, are drawn in the hysteresis curve 15. Starting from a positive remanence 105 in the first segment 84, the remanence is shifted to the hysteresis point by the oppositely directed segment 85 to then be shifted into saturation 107 by the positive angle 86 which dominates the negative segment angle. As a result, there is a small inrush peak current which does not endanger the circuit. By means of the comparator circuit 92, the inrush peak current produces a predetermined segment angle 198 which sets the remanence at a precise, predetermined point 108 so that the dim condition 100 predetermined by the rotary-knob potentiometer 99 can be set.

This circuit, which is installed in front of a single-phase grid transformer, can be expanded to a multiphase, inductive current supplying device. Here, in the additional branches S, R and T, additional a.c. switches 38, which are preferably controlled via potential isolation of the optocoupler, are provided in the respective through-going lines.

FIG. 13 shows signal variations when switching on the transformer 1 with a dimmer 2. The grid voltage 10 was switched off at a moment 11 when it was in a positive half-wave 14. The remanence 16 is thereby set in the positive and shifted into saturation by the segments 17, 21 and 23 so that the circuit illustrated in FIG. 12 reacts to the small inrush peak current 20 and generates a one-time, large negative segment angle 198 to set the remanence precisely because the current exceeded 1.5 times the rated current. Instead of this threshold of 1.5 times the rated current preset by the comparator 89, 91 and 92, it is also possible, for instance, to use 5 times the rated current as the triggering threshold.

On the other hand, when the grid voltage is switched off at a moment 11' at the beginning of a positive half-wave 14', the remanence has a negative value which symmetrizes itself by means of the segments 17, 21 and 23 so that the desired segment angle 110 is achieved without the occurrence of an inrush peak current 25 in the primary-side current 26.

Until the symmetrical, desired segment angle 110 is achieved, the bipolar and enlarging segments have an asymmetry. When the polarity of the first segment is opposite to the polarity of the remanence, the comparator 92 detects no currents which go beyond the rated current 26 of the circuit of FIG. 12 so that the desired segment angle 110 is obtained after a certain number of segments which increase in angular value and have the same polarity. Following the delay time of the delaying member 46, the desired value switch 48 is switched on.

However, if the polarity of the remanence given by the moment 11 of switching-off and that of the first segment 17 are the same, the inrush currents integrate so that the primary-circuit current 26 exceeds the predetermined value of the rated current after a number of segments determined by the characteristics of the transformer 1. This inrush peak current 25 of, for example, 1.5 times the rated current 26 leads to a one-time, remanence-setting segment having a large angle 198. This segment angle 198 is greater than 90 degrees and can also span the entire half-wave, that is, 180 degrees. This segment angle 198, which is preset by the potentiometer 97' and 98, is typical for the transformer 1 being used.

Naturally, the circuit of FIG. 12 can also be constructed with a suitable other polarity so that the first segment angle 17 occurs before a positive zero intercept of a negative half-wave and an inrush peak current 25 of correspondingly different polarity results in triggering of the comparator in order to generate the remanence-setting half-wave. This half-wave with the segment angle 198 is then correspondingly switched on in a positive half-wave 14.

FIG. 14 shows a block circuit diagram of another exemplary embodiment of a device for a.c. inrush limiting, the device including an undercurrent and overcurrent protective circuit. The same features are characterized by the same reference characters. In the following, the differences to the device illustrated in FIG. 12 will be described.

The grid component 31 makes available the positive operating voltage 32 relative to ground 34 for the supply of current to the electronic components in the circuit and applies the negative operating voltage 33 to the sawtooth generator 67. A rapid grid off-signal impinges the transistor 270 which rapidly discharges the capacitor 41 so that a new grid on-signal can always be produced even when switching-off and switching-on are performed shortly after one another. The negative grid zero intercept detection circuit 69 has a balun 271 for zero adjustment.

The AND-gate 54 is replaced by an inverting AND-gate 254 which controls the triac 38 via an optocoupler 201 having an LED 202 connected in opposition to the positive supply voltage 32. The control electrode 255 of the triac 38 is connected with the optocoupler 201 by means of a resistor 203', the other plug of the optocoupler 201 being electrically connected to the transformer 1.

The analog comparator 92 has two inputs 203 and 204. The input 203 is, as in the circuit of FIG. 12, impinged by the output signals of the current transformers 87 and 88 while the input 204 is connected with a potentiometer 205 which can be preset and allows tapping of a voltage between the positive operating voltage 32 and circuit ground 34. The voltage threshold beyond which the analog comparator 92 emits a voltage signal generated by the current transformer 87 or 88 as too high, and thus as an overcurrent signal, is set by the potentiometer 205. The voltage threshold set by the potentiometer is, for instance, 1.5 times to 7 times the rated current.

The output of the positive current transformer 87 is connected, via a voltage divider 210, with inputs of over-/undercurrent comparators 211 and 212 whose second inputs are arranged parallel to the measuring shunt 39 and the primary winding of the transformer 1 through a potentiometer 213. A resistor 214 and a diode 215 are connected in series with the potentiometer 213. A capacitor 218 is arranged parallel to the potentiometer 213. At its output 217 leading to the comparators 211 and 212, this desired current detection circuit 216 produces a desired-current signal which, in the comparators 211,212, is compared with the actual-current signal adjusted by means of the voltage divider 210. The over- or undercurrent detection thereby also functions with segmented half-waves.

Upon occurrence of an overcurrent, the overcurrent comparator 211 gives off a load fault signal 221 which impinges an OR-gate and, through this, the setting input of a flip-flop 223. The flip-flop 23 gives off, via its output 224, an overcurrent load fault signal which can be indicated, for instance, by means of an LED-resistor combination 225,226 in opposition to ground 34.

The analog comparator 212 for undercurrent detects an undercurrent signal which can arise, for example, when lamp connections of a low-voltage illuminating system make poor contact with current-carrying wires. The additional resistance which then arises reduces the actual current. The danger of such an undercurrent lies in the fire hazard at the at the poorly contacting junctions which heat up.

The signal applied to the inverting output 228 of the flip-flop 223 when there is an over- or undercurrent impinges the AND-gate 254 which switches the triac 38. Consequently, when there is a load fault, the dimmer is switched off both for overcurrent and undercurrent.

The switch 230 used in a preferred embodiment permits a positive choice to be made between automatic dimming and the previously described switching-off when an undercurrent occurs. If, in contrast to the showing in FIG. 14, the switch is switched to the line 232 which impinges the OR-member 222, an undercurrent load fault signal 228 will switch off the dimmer. In the situation illustrated in FIG. 14, the output signal of the analog comparator 212 for undercurrent impinges an undercurrent detection flip-flop 235. The output of the undercurrent detection flip-flop 235 optically indicates an undercurrent through an additional resistor-LED combination 225,226 and further closes the partial-load switch 237 via the level 1-signal in the line 236. By means of the partial-load switch 237, a preset potentiometer 273 turns down the dimmer to a lower intensity value in that the voltage of the capacitor 63 is maintained at a higher voltage value. A resistor 274 of, for instance, 100 kilohm, is arranged in series with the switch 237 so that the change in the segment takes place slowly.

The level 1-signal generated by the analog comparator 65 before the zero intercept of the half-wave of the grid voltage is then short, and thus the uniform segment angle which determines the duration of current flow and thereby the intensity of, for example, a halogen light. It is accordingly possible, for example, in industrial spaces, to maintain a harmless emergency illumination by means of a small segment angle despite an underload fault.

The inverting output 240 of the undercurrent detection flip-flop 235 is, at the same time, connected with an AND-gate 241 arranged behind the output 47 of the monoflop 46 so that the desired value switch 48 is held open, that is, blocks in the event of an undercurrent. In this manner, then, the partial segment is established by the potentiometer 273. The reset inputs of the flip-flops 223 and 235 are connected with the output of the monoflop 46 so that they are set back by the grid on-signal applied to the input 45 of the monoflop 46.

The measuring shunt 39 can, for instance, have a resistance value of 0.1 ohm. The resistor in series with the desired value switch 48 can have a value of, for example, 220 kilohm, and the potentiometer 99 adjustable by the operator a maximum adjustable resistance value of 20 kilohm. The segment angle adjusting potentiometer 97 likewise has a maximum resistance value of 20 kilohm. The charging resistor 62 has a resistance of 10 kilohm and the discharging resistor 64 a resistance value of 1 Megohm.

FIG. 15 shows a further exemplary embodiment of the invention, and the circuit for remanence-setting illustrated here operates with unipolar, segmented half-waves.

This circuit, also, can be used for dimming of a low-voltage, halogen illuminating system or to switch on a welding transformer, for example.

The grid voltage 6 supplies a grid component 31 which is advantageously ironless and makes the positive operating voltage 32 available for the circuit illustrated in FIG. 15. One plug 27 is connected with circuit ground 34 while the other plug 28 leads, on the one hand, to the grid component 31 via a grid switch 35 and, on the other hand, to the primary winding 36 of the transformer 1. A load 37 is connected to the secondary side of the transformer 1.

The second primary-side plug of the transformer 1 is connected to circuit ground 34 by way of an a.c. switch 38 which is in the form of a triac and can also be replaced by two thyristors and by way of a measuring shunt 39 which, for example, has a value of 0.01 to 0.1 ohm.

The grid component 31 generates a rapid and dynamic grid-on detection signal which is applied to the base of a transistor 40'. The transistor 40' rapidly discharges a capacitor 41, which is connected parallel to the center and the collector, between positive operating voltage 32 and circuit ground 34. The grid-on detection signal, which ensures that the a.c. switch is switched on only when all circuit components have a reliable supply of current, is likewise a level 1-signal when the voltage comparing device of the grid component 31 detects an undervoltage supply.

The positive supply voltage 32 generated by the grid component 31 charges the capacitor 41 relative to the circuit ground 34 via the resistor 40, for instance, in 200 milliseconds. Thus, a level 0-signal is present in the line 42 for the charging time of the capacitor 41. The level 0-signal is converted into a grid on-signal 44 by an inverter 43. The grid on-signal is impressed upon an unblocking and blocking input 145 of a segment control circuit 146 via an inverter 52.

The segment control circuit 146 can be realized, for instance, by the integrated circuit TCA 785 of the firm Siemens. The segment control circuit 146 is connected with the circuit ground 34 by means of the line 147 and with the positive operating voltage 32 by means of the line 147'. The plug 28 is connected with the synchronizing input 169 of the segment control circuit 146 via the main switch 35 and an RC circuit 148.

The RC circuit 148 which can be constructed, in particular, from a parallel circuit of a resistor 148' and a capacitor 148", simulates a grid voltage, which leads by several radians, at a synchronizing input 169 of the segment control unit 146. Thus, the circuit commutated turn-off time of the thyristors at the end of each grid half-wave is compensated for and, as a result, the triggering signal ends somewhat before the actual grid half-wave.

A ramp generator is provided in the segment control circuit 146. The maximum voltage and fall-off characteristics of the existing signal ramp which, for instance, is sawtooth-shaped, are adjustable with the ramp resistor 149 and the ramp capacitor 149'.

A comparator, in which the ramp voltage signal is continuously compared with a voltage control signal impressed upon the control line 150, is further provided in the segment control circuit 146.

This comparison takes place when a level 1-signal is applied to the unblocking or blocking input 145. As soon as the external voltage signal impinging the segment control circuit 146 in the control line 150 becomes smaller than the monotonically increasing ramp or sawtooth voltage, a switching pulse is applied to the positive switching line 153 during a positive half-wave 114 of the a.c. grid voltage 10 and a switching pulse is applied to the negative switching line 154 during a negative half-wave 118 of the a.c. grid voltage 10. The pulse duration is defined in such a manner by the wiring of the pulse duration control line 15 with circuit ground 34 that the pulse duration is always extended to the zero intercept of the half-wave 114 or 118 which is then present. Since the triac 38 is triggered by switching pulses in the lines 153 and 154 and it is necessary to prevent triggering of the triac by a pulse which is still present in the line 153 or 154 at the zero intercept of the a.c.

grid voltage 10, The RC circuit 148, which simulates a leading grid voltage 10, is arranged in front of the synchronizing input of the segment control circuit. Accordingly, the pulse applied to the line 153 or 154 reliably terminates several degrees before the respective zero intercept of the a.c. grid voltage 10.

The negative switching line 154 of the segment control circuit 146 is connected with the input of an OR-gate 156 whose output is connected, via a resistor 157 and/or an optocoupler, for example, to the control and triggering electrode 158 of the triac 38.

The previously mentioned grid on-signal 44 further impinges upon a setting switch 61 one of whose switching contacts is connected with the positive supply voltage 32. The other contact is connected with circuit ground 34 by means of a charging resistor 162 and a capacitor 163. The setting switch 61 which closes for the duration of, for instance, the 0.1 second grid on-signal charges the capacitor 63 via the charging resistor 62. The capacitor 63 thereafter again discharges through the discharging resistor 64. The time constant of the RC member 63,64 is, for example, approximately 0.5 second. Hence, shortly after switching on the grid component 31, a positive voltage is applied to the control line 150 via the line 166. The signal of the control line is compared with the ramp voltage signal in the segment control circuit 146.

After the unblocking of the segment control circuit 146, the triac 38 is thus triggered by means of negative segments with ever-increasing angle so that the current supplying device 1 is slowly driven into saturation with the asymmetrical, purely negative segments. The segments can also have a constant angular value. Under certain circumstances and for specific, high-leakage transformers 1, this simpler circuit structure does not guarantee that the saturation 124 which results in a small inrush peak current 25 is reliably achieved.

The output signal of the sawtooth generator has a positive slope which goes from a voltage value of 0 volt at the beginning of the ramp to a predetermined maximum voltage at which it is again reset by the next zero intercept of the grid a.c. voltage 10 which, leading somewhat, is applied to the synchronizing input 169 of the segment control circuit 146. The capacitor voltage signal in the line 166 falls off over several periods. In the analog comparator, the voltage of the capacitor 63 is compared with the respective voltage of the ramp of the sawtooth generator. If the voltage of the sawtooth generator is greater, a level 1-signal is sent to the line 154 and, by way of the OR-gate 156, results in a triggering signal at the control electrode 158 of the triac 38, so that a steadily growing segment is produced prior to each second zero intercept of the grid a.c. voltage 10.

When the saturation 119 of the transformer 1 is reached, an inrush peak current 25 occurs after the next segmented, negative half-wave and is detectable in the negative current transformer 88 through a voltage measurement via the measuring shunt 39.

The output of the negative current transformer 88 is connected to an input of an analog comparator 92 by way of a resistor 89. The other input 190 is connected to the positive operating voltage 33 via a voltage divider resistor 91 and to circuit ground 34 via a voltage divider resistor 91'. The analog comparator 92 generates a positive output signal only when the negative current transformer 88 issues a sufficiently large positive signal. This signal threshold magnitude depends upon the predetermined ratio of the resistors 91 and 91' to one another. The comparative voltage signal impressed upon the input 191 of the analog comparator 92 is preferably adjusted in such a manner that a positive output signal indicative of a small inrush peak current is applied to the output of the analog comparator 92 when a current having a value between 2 times and 10 times the rated current 126 arises in the primary circuit of the transformer 1.

The output 92' of the analog comparator 92 is connected with the setting input 193 of a flip-flop member 51 which is switched by the ascending signal flank. The output 94 of the flip-flop member 51 is connected with the control input of a switch 196. The switch 196 connects the circuit ground 34, by way of a resistor 197, to the RC member 63,64 with which the comparative control voltage can be set. By closing the switch 196 upon occurrence of an overcurrent, the capacitor 63 is rapidly discharged so that a triggering signal, which impinges an input of an AND-gate 95, is applied to the positive switching line 53 directly at the beginning of the immediately following, positive half-wave. The level 1-output signal 194 of the flip-flop 51 simultaneously impinges the other input of the AND-gate 95. Consequently, a level 1-output signal of the AND-gate 95 is applied to a second input of the OR-gate 56 so that the through-going level 1-signal triggers the triac 38 with an angle of 170 degrees to 180 degrees during the positive half-wave 114.

In addition the grid on-signal 44 impinges the reset input 49 of the flip-flop member 51 so that the above-described remanence-setting can be carried out after each grid on-signal or undercurrent detection signal of the grid component 31.

At the inverting output of the flip-flop 51, an LED 198 is connected to circuit ground 34 by way of a protective resistor 198'. The LED 198 remains lit as an indication to a user for as long as the remanence-setting has not occurred.

One contact of a further desired value switch not illustrated in the drawing can be connected to a potentiometer which is disposed between the positive operating voltage 32 and the circuit ground 34. This additional setting switch is closed via a delaying member only when the remanence-setting has been carried out.

This additional dimming, desired value switch is connected in series with the capacitor 163 via a resistor and encompasses a potentiometer which is adjustable by the operator. By means of the potentiometer, the voltage of the capacitor 163 is adjustable between the positive supply voltage 32 and the circuit ground 34 so that a plateau range established by the operator arises in the voltage of the capacitor 163. Thus, during the following half-wave, the same predetermined and symmetrical segment angle is always used and leads to the desired, dimmed condition of the transformer 1 and the load connected thereto.

The circuit in FIG. 15, which is arranged in front of a single-phase grid transformer, can be expanded to a multiphase inductive current supplying device. Here, in at least two further branches of the branches R, S and T, additional a.c. switches 38 are respectively provided in the through-going lines and are each controlled by an individual segment control circuit 146, preferably by way of potential-isolating optocouplers.

FIG. 16 shows signal forms upon switching on the transformer 1 with a device according to an exemplary embodiment of the invention. The grid voltage 10 was switched off at a random moment not illustrated in the drawing. The remanence is thereby randomly set positively or negatively and is shifted into saturation by the segments 117, 121 and 123 which have a monotonically increasing angular value of current flow. The circuit illustrated in FIG. 15 thus reacts to the small inrush peak current pulse 25 since the current exceeded twice the rated current, for example, and produces a large positive segment angle 198'. The latter can be followed in both half-wave polarities by large angles or again by smaller segment angles obtained by subsequent, automatic, slow changes in the large angle. Instead of this threshold of twice the rated current preset by the comparator, it is also possible, for instance, to use 0.5 times or 5 times the rated current as the triggering threshold.

In principle, the transformer remanence in FIG. 16 is properly set after the second negative segment 121. The following, third negative segment 123 is used to produce the small inrush peak current 25 in order to be able to switch, with the assistance thereof, and at constant segment angles 197', between positive and negative half-waves during continuous operation.

The unipolar and growing segments 117, 121 and 123 depicted in FIG. 16 exhibit an increasing asymmetry until the small inrush peak current 25 is achieved. When the polarity of the first segment is opposite to the polarity of the remanence, the remanence is accurately shifted in the other saturation direction by a large number of segments. The slowly increasing angular values here insure that the saturation is reliably achieved despite possible power losses.

If, however, the polarity of the remanence obtained by the moment of switching-off and that of the first segment 117 are the same, then a primary circuit current pulse 26 going beyond the predetermined value of the rated current already occurs, depending upon the characteristics of the transformer 1, after a few segments and at a specific segment size. This inrush peak current 25 of, for example, twice the rated current, is understood as the indication by the transformer that its remanence has now been set in the direction of the current 25. The immediately following segment of large angle and opposite polarity then leads to 198' is greater than 150 degrees when the beginning of the positive half-wave is defined as 0 degrees and can also encompass the entire positive half-wave, that is, 180 degrees.

This segment angle 198', which can be preset by a potentiometer connected, if necessary, to the setting switch 61, is typical for the transformer 1 being used.

The circuit of FIG. 15 can, of course, be constructed with an appropriate different polarity so that the first segment angle 117 occurs before a positive zero intercept of a negative half-wave 118 and an inrush peak current of correspondingly different polarity causes activation of the comparator in order to produce the remanence-setting half-wave. This half-wave with the segment angle 198' is then correspondingly transposed to a positive half-wave 114. The AND-gate 95 is then placed in the negative switching line 154 and the negative current transformer 88 is replaced by a positive current transformer.

The measuring shunt 39 can, for instance, have a resistance value of 0.1 ohm. The charging resistor 62 and the resistor 197 have a resistance of 12 ohms, for instance, and the discharging resistor 64 a resistance value of 1.2 kilohm so that, during a required full-load operation without segments, no interruptions in the current 26 occur due to a small segment.

I claim:

1. A method of energizing an electrical load with a cyclical voltage, comprising the steps of:

sensing a selected current component of the load produced by the supply of said cyclical voltage;

initiating supply of voltage to said load, while performing the sensing step, for a fraction of at least one selected part-cycle of each of a plurality of successive voltage cycles, the fraction of the part cycle of the successive voltage cycles increasing progressively during the initiating step, maintaining the initiating step until one of the fractional selected part-cycles causes said selected load current component to reach a predetermined current magnitude or until the voltage applied to said load reaches a predetermined voltage magnitude; and continuing to supply said load with voltage following the initiating step with additional part-cycles of said cyclical voltage.

2. The method of claim 1, wherein said load includes a magnetizable core.

3. The method of claim 2, wherein said load is an inductive load.

4. The method of claim 1, wherein said selected current component is a reactive current.

5. The method of claim 1, wherein said predetermined voltage magnitude is the rated voltage for said load.

6. The method of claim 1, wherein said cyclical voltage is an a.c. voltage.

7. The method of claim 1, wherein said one fractional selected part-cycle causes said selected current component to reach said predetermined current magnitude, said additional part-cycles applied including an initial additional part-cycle of opposite sign from said one fractional selected part-cycle, and the continuing step comprising supplying said load with said cyclical voltage for a fraction of said initial additional part-cycle of greater value than the fraction corresponding to said one fractional selected part-cycle.

8. The method of claim 1, wherein said one fractional selected part-cycle causes said selected current component to reach said predetermined current magnitude; and further comprising the step of interrupting the supply of voltage to said load between the initiating and continuing steps.

9. The method of claim 8, wherein said additional part-cycles supplied include an initial additional part-cycle of the same sign as said one fractional selected part-cycle, the continuing step comprising supplying said load with said cyclical voltage for a fraction of said initial additional part-cycle having a value not greater than the fraction corresponding to said one fractional selected part-cycle.

10. The method of claim 8, wherein the interrupting step is performed for less than one period of said cyclical voltage.

11. The method of claim 1, wherein each of said at least one selected part-cycles of said initiating step cyclical voltage have the same sign.

12. The method of claim 1, wherein consecutive ones of said at least one selected part-cycles of said initiating step cyclical voltage have opposite signs.

13. The method of claim 1 for a load having three phases further comprising performing the initiating step for each of a selected two of the three load phases and one fractional selected part-cycle in each of the two selected phases causes a selected current in the respective phase to reach a respective predetermined current magnitude, and performing the continuing step for each of said two selected phases, the additional part-cycles supplied to each of said two selected phases including an initial additional part-cycle of opposite sign from that of the respective one fractional selected part-cycle of each of said two selected phases.

14. The method of claim 13, wherein said three phases form a delta connection or a Y connection.

15. The method of claim 13, wherein the continuing step comprises supplying the third phase with said cyclical voltage with a delay relative to the voltage supplied to each of said two selected phases.

16. The method of claim 15, wherein the continuing step is performed to make the sum of the reactive current components in said two selected phases approximately zero.

17. The method of claim 16, wherein at least one of said initial additional part-cycles supplied to one phase produces a reactive current pulse having a magnitude which is at least as large as that of the magnitude of the respective no-load reactive current component of said one phase.

18. The method of claim 1 for a load having three phases further comprising performing the initiating step for each of a selected two of the three load phases and one fractional selected part-cycle in each of the two selected phases causes a selected current component in the respective phase to reach a respective predetermined current magnitude, performing the continuing step for each of said two selected phases; and further comprising the step of interrupting the supply of voltage to said two selected phases between the respective initiating and continuing steps for each of said two selected phases, the additional part-cycles supplied to each of said two selected phases including an initial additional part-cycle of the same sign as the respective one fractional selected part-cycle for each of said two selected phases, and the continuing step comprising providing each of said two selected phases with said cyclical voltage for a fraction of the respective initial additional part-cycle corresponding to the respective one fractional selected part-cycle for each of said two selected phases.

19. The method of claim 18, wherein said three phases form a delta connection or a Y connection.

20. The method of claim 18, wherein the continuing step comprises providing the third phase with said cyclical voltage with a delay relative to the voltage supplied to each of said two selected phases.

21. The method of claim 20, wherein the continuing step is performed to make the sum of the reactive current components in said two selected phases approximately zero.

22. The method of claim 18, wherein at least one of said initial additional part-cycles supplied to one of said two selected phases produces a reactive current pulse having a magnitude which is at least equal to that of the magnitude of the respective no-load reactive current component of said one phase.

23. The method of claim 1 for a load having three phases, wherein the initiating step is performed for only one of said three phases and said one fractional selected part-cycle causes said selected current component of said one phase to reach said predetermined current magnitude in said one phase, the continuing step also being performed for said one phase, and said additional part-cycles supplied during said continuing step including an initial additional part-cycle of opposite sign from said one fractional selected part-cycle supplied to said one phase.

24. The method of claim 23, wherein said three phases form a Y connection with neutral conductor.

25. The method of claim 23, wherein the continuing step further comprises subjecting the two other phases to said cyclical voltage with a delay relative to said one phase.

26. The method of claim 25, wherein the continuing step is performed to make the sum of the reactive currents in said three phases approximately zero when said other two phases are initially subjected to said cyclical voltage.

27. The method of claim 25, wherein the continuing step is performed to make the currents in said three phases substantially equal and substantially symmetrical with respect to one another when said two other phases are initially subjected to said cyclical voltage.

28. The method of claim 23, wherein said initial additional part-cycle supplied to each phase produces a reactive current pulse having a magnitude which is at least of the magnitude of the no-load reactive current component of a respective phase.

29. The method of claim 1 for a load having three phases, wherein the initiating step is performed for only one of said three phases and said one fractional selected part-cycle causes said selected current component of said one phase to reach said predetermined current magnitude, the continuing step also being performed for said one phase; and further comprising the step of interrupting the supply of voltage to said one phase between the initiating and continuing steps, said additional part-cycles supplied to said one phase including an initial additional part-cycle of the same sign as said one fractional selected part-cycle of said one phase, and the continuing step further comprising subjecting said one phase to said cyclical voltage for a fraction of said initial additional part-cycle of a value which is smaller than the fraction corresponding to said one fractional selected part-cycle of said one phase.

30. The method of claim 29, wherein said three phases form a Y connection with neutral conductor.

31. The method of claim 29, wherein the continuing step comprises subjecting the two other phases to said cyclical voltage with a delay relative to the cyclical voltage supplied to said one phase.

32. The method of claim 29, wherein said initial additional part-cycle produces a reactive current pulse having a magnitude which at least approximates the magnitude of the respective no-load reactive current component of said one phase.

33. The method of claim 1, wherein said predetermined current magnitude is at least approximately equal to the peak value of the no-load reactive current.

34. The method of claim 33, wherein said one fractional selected part-cycle causes said selected current component to reach said predetermined current magnitude; and further comprising the step of storing the value of the fraction corresponding to said one fractional selected part-cycle.

35. The method of claim 1, wherein the sensing step comprises sensing the reactive current component and the active current component and the initiating step causes the peak values of said current components to approach one another, said selected current component being said reactive current component, and further comprising terminating the initiating step when said one fractional selected part-cycle causes the peak value of said reactive current component to be at least approximately equal to the peak value of said active current component.

36. The method of claim 35, further comprising the step of storing the value of the fraction corresponding to said one fractional selected part-cycle.

37. The method of claim 1 for a load having three phases, and further comprising performing the initiating step for each of said three phases.

38. The method of claim 37, wherein consecutive fractional selected part-cycles in each of said three phases are of opposite sign.

39. The method of claim 38, wherein corresponding fractional selected part-cycles for different phases have like sign.

40. The method of claim 37, wherein corresponding fractional selected part-cycles for different phases have substantially the same value.

41. The method of claim 37, wherein in at least one phase said selected current component is the reactive current component and said one fractional selected part-cycle produces a reactive current pulse of said predetermined current magnitude, performing the continuing step for said at least one phase, and the additional part-cycles for said at least one phase including an initial additional part-cycle of opposite sign from said reactive current pulse, the continuing step further comprising subjecting said at least one phase to said cyclical voltage for a proportion of said initial additional part-cycle which exceed the fraction corresponding to said one fractional selected part-cycle of said at least one phase.

42. The method of claim 1, wherein said selected current component is the reactive current component and said one fractional selected part-cycle produces a reactive current pulse of said predetermined current magnitude, said additional part-cycles including an initial additional part-cycle, and the continuing step comprising supplying said load with said cyclical voltage for a proportion of said initial additional part-cycle which is smaller than the fraction corresponding to said one fractional selected part-cycle when said initial additional part-cycle and said reactive current pulse have the same sign, and supplying said load with said cyclical voltage for a proportion of said initial additional part-cycle which is greater than the fraction corresponding to said one fractional selected part-cycle when said initial additional part-cycle and said reactive current pulse are of opposite sign.

43. The method of claim 42, wherein the sensing step comprises continuously sensing said reactive current component.

44. The method of claim 42, wherein the initiating step causes the value of said reactive current component and the value of the active current component to approach one another, and further comprising terminating the initiating step when said one fractional selected part-cycle causes the value of said reactive current component to be at least approximately equal to the value of said active current component.

45. The method of claim 1 for a load having a plurality of phases, further comprising the step of selectively determining the interconnection of said phases.

46. The method of claim 45, wherein the determining step comprises subjecting one of said phases to said cyclical voltage for a substantially constant fraction of at least one part of each of a plurality of said voltage cycles, and monitoring the current associated with said constant fractional part-cycles.

47. A circuit for energizing an electrical load having a magnetizable core, from a source of cyclical voltage, comprising:

means for sensing a selected current component of the load produced by the supply of the cyclical voltage; and means connected to said sensing means for regulating the voltage supplied to the load, said regulating means including activating means for:

(i) initiating the supply of voltage to the load to subject the load to the cyclical voltage for progressively increasing fractions of selected voltage part-cycles until one of the fractional selected part-cycles causes the selected current component to reach a predetermined current magnitude or until the voltage applied to the load reaches a predetermined voltage magnitude, and (ii) thereafter continuing to supply to the load the cyclical voltage during additional voltage part-cycles.

48. The circuit of claim 47, wherein said activating means comprises means for setting the fraction size of said selected voltage part-cycles and means responsive to said setting means for generating triggering signals for the load.

49. The circuit of claim 47, wherein said regulating means further comprises means for triggering the load.

50. The circuit of claim 49, wherein said triggering means comprises an a.c. switch arranged in series with the load and connected to said activating means.

51. The circuit of claim 47 responsive to a current component of the predetermined current magnitude, wherein said regulating means supplies the additional part-cycles to include an initial additional part-cycle of opposite sign from said one fractional selected part-cycle and said activating means comprises means responsive to a current component of the predetermined current magnitude to subject the load to the cyclical voltage for a fractional part of the initial additional part-cycle which exceeds the fraction corresponding to said one fractional selected part-cycle.

52. The circuit of claim 47 for use in responding to a current component of the predetermined current magnitude, wherein said activating means comprises means responsive to a current component having the predetermined current magnitude to temporarily interrupt the supply of voltage to the load.

53. The circuit of claim 52, wherein said activating means is responsive to termination of the temporary interruption to subject the load to the cyclical voltage during an initial additional part-cycle of the same sign as said one fractional selected part-cycle and during a successive second additional part-cycle of opposite sign.

54. The circuit of claim 53, wherein said activating means further comprises means operating during said initial additional part-cycle to limit supply to the load of the cyclical voltage to a fractional part of said initial additional part-cycle which is no greater than the fraction corresponding to said one fractional selected part-cycle.

55. The circuit of claim 52, wherein said activating means further comprises means for limiting the length of the temporary interruption to less than one period of the cyclical voltage.

56. The circuit of claim 47 responsive to the current component of the predetermined current magnitude, wherein said sensing means comprises means for comparing the magnitude of the selected current component with the predetermined current magnitude and said activating means comprises means having an input for generating triggering signals for the load, and said comparing means having an output connected to said input, said additional part-cycles including an initial additional part-cycle of opposite sign from said one fractional selected part-cycle, said generating means responsive to a signal from said comparing means after said selected current component reaches the predetermined current magnitude, generates at least one triggering signal which causes the load to be subjected to the cyclical voltage for a predetermined fractional portion of said initial additional part-cycle greater than the fraction corresponding to said one selected part-cycle.

57. The circuit of claim 56, wherein said comparing means is in series with the load.

58. The circuit of claim 56, wherein said activating means operates said generating means to generate additional load-triggering signals following the one triggering signal, each of the additional triggering signals associated with a respective one of a series of consecutive additional part-cycles following the initial additional part-cycle, and each of the additional triggering signals causing the load to be subjected to the cyclical voltage for substantially the same predetermined fractional portion of the respective additional part-cycle.

59. The circuit of claim 47, wherein said activating means supplies fractional selected part-cycles all of the same sign.

60. The circuit of claim 59 responsive to a current component of the predetermined current magnitude, wherein said sensing means comprises means for comparing the magnitude of the selected current component with the predetermined current magnitude and said activating means comprises means having an input for generating triggering signals for the load, and said comparing means having an output connected to said input, each of the part-cycles being a half-cycle with an electrical angular range of 180 degrees, and the additional part-cycles including an initial additional part-cycle successive to, and of opposite sign from said one fractional selected part-cycle, said generating means responsive to a signal from said comparing means after the magnitude of the selected current component reaches the predetermined current magnitude generating at least one triggering signal which causes the load to be subjected to the cyclical voltage for at least 150 electrical degrees of the initial additional part-cycle.

61. The circuit of claim 60, wherein said generating means generates additional load-triggering signals following the one triggering signal, each of the additional triggering signals associated with a respective one of a series of consecutive additional part-cycles directly following said initial additional part-cycle, and each of the additional triggering signals causing the load to be subjected to the cyclical voltage for at least 150 electrical degrees of the respective additional part-cycle.

62. The circuit of claim 60, wherein said generating means generates additional load-triggering signals following the one triggering signal, each of the additional triggering signals associated with a respective one of a series of consecutive additional part-cycles following said initial additional part-cycle, and each of the additional triggering signals causing the load to be subjected to the cyclical voltage for substantially the same predetermined proportion of the respective additional part-cycle.

63. The circuit of claim 47, wherein said activating means further comprises voltage storing means for producing first voltage signals which vary with time, generator means for producing second voltage signals which vary cyclically with the cyclical voltage, and comparator means for comparing the first and second voltage signals and issuing load-triggering signals when the first and second voltage signals are equal.

64. The circuit of claim 63, wherein said storing means comprises a resistor and a capacitor connected in parallel to produce voltage signals which decay over time, said generator means including a sawtooth generator producing voltage signals which cyclically increase with time.

65. The circuit of claim 63, wherein said activating means further comprises means for setting the voltage of said storing means to a predetermined value in response to the cyclical voltage.

66. The circuit of claim 63 responsive to a current component of the predetermined current magnitude, wherein the additional part-cycles include an initial additional part-cycle and the voltage of said storing means determines the proportion of the initial additional part-cycle to which the load is subjected to the cyclical voltage, said activating means including at least one setting means responsive to a current component of the predetermined current magnitude to set the voltage of said storing means to subject the load to the cyclical voltage for a preselected proportion of said initial additional part-cycle.

67. The circuit of claim 66, wherein said sensing means comprises means for producing a voltage drop and means for comparing current from said producing means with the predetermined current magnitude, said comparing means activating said one setting means when the current from said producing means reaches the predetermined current magnitude.

68. The circuit of claim 67, wherein said producing means is in series with the load.

69. The circuit of claim 67, wherein said comparing means activates said one setting means when the predetermined current magnitude is between 1 and 10 times the rated current of the load.

70. The circuit of claim 66, wherein said activating means includes an additional setting means which, following said initial additional part-cycle, sets the voltage of said storing means to subject the load to the cyclical voltage for a substantially constant predetermined proportion of each of a series of consecutive additional part-cycles following said initial additional part-cycle.

71. The circuit of claim 70, wherein said sensing means has an output and said additional setting means has an input connected to said output, said regulating means further comprising delaying means between said sensing means output and said additional setting means input.

72. The circuit of claim 63, wherein said regulating means further comprises triggering means for the load, and means for deactivating said triggering means in response to a current which exceeds an upper threshold value or is below a lower threshold value.

73. The circuit of claim 72, wherein said regulating means further comprises limiting means responsive to a current below the lower threshold value to limit the supply of cyclical voltage to the load to a fractional part of each of a series of consecutive additional part-cycles.

74. The circuit of claim 73, wherein the voltage of said storing means determines said fractional parts of each additional part-cycle of the cyclical voltage supplied to the load, said limiting means including at least one setting means responsive to a current below the lower threshold value, sets the voltage of said storing means so that the load is supplied with a preselected fractional part of each of the series of consecutive part-cycles.

75. The circuit of claim 47, wherein said activating means comprises voltage storing means for producing first voltage signals which vary with time, generator means for producing second voltage signals which vary cyclically with the cyclical voltage, and comparator means for comparing the first and second voltage signals, said comparator means having a first output for issuing first load-triggering signals when the first and second voltage signals are equal during a part-cycle of one sign and a second output for issuing load-triggering signals when the first and second voltage signals are equal during a part-cycle of opposite sign.

76. The circuit of claim 75 responsive to a current component of the predetermined current magnitude, wherein said regulating means comprises means connected with one of said outputs for blocking the respective triggering signals until the selected current component reaches the predetermined current magnitude.

77. The circuit of claim 47 responsive to a current component of the predetermined current magnitude, wherein the additional part-cycles include an initial additional part-cycle and said activating means includes first means responsive to a current component of the predetermined current magnitude to cause the load to be subjected to the cyclical voltage for a first preselected fractional part of at least the initial additional part-cycle, said activating means further including second means to cause the load to be subjected to the cyclical voltage for a second fractional part of other additional part-cycles following the initial additional part-cycle, and said activating means effecting a progressive transition from said first preselected fractional part to said second preselected fractional part.

78. The circuit of claim 77, wherein said first means causes the load to be subjected to the cyclical voltage for the first predetermined fractional part of the initial additional part-cycle and a series of consecutive additional part-cycles immediately following the initial additional part-cycle.

79. The circuit of claim 47, wherein said activating means comprises means for generating triggering signals for the load, said generating means having an input for a synchronizing voltage; and further comprising means connected to said input for causing the synchronizing voltage to lead the cyclical voltage.

80. The circuit of claim 47, wherein said sensing means comprises first means for detecting a reactive current component and second means for detecting an active current component.

81. The circuit of claim 80, wherein the reactive and active current components become at least approximately equal during a predetermined part-cycle and said activating means subjects the load to the cyclical voltage for a predetermined fractional part of the predetermined part-cycle, said regulating means further comprising means for comparing the reactive and active current components and for storing the predetermined fractional portion.

82. The circuit of claim 47 for use with a multiphase load, wherein said sensing means comprises a first sensing unit for one of the phases and a second sensing unit for another of the phases.

83. The circuit of claim 82, wherein said regulating means further comprises a triggering unit for each phase, and means for determining the triggering sequence for each of the phases.

84. The circuit of claim 47 for use with a multiphase load, wherein said regulating means further comprises means for establishing the connection of the phases.

85. The circuit of claim 47 for use with a multiphase load, wherein said regulating means further comprises means for delaying triggering of one phase relative to another phase.

* * * * *

UNITED STATES PATENT AND TRADEMARK OFFICE
CERTIFICATE OF CORRECTION

PATENT NO.   :  5,479,086
DATED        :  December 26, 1995
INVENTOR(S)  :  Michael KONSTANZER It is certified that error appears in the above-indentified patent and that said Letters Patent is hereby corrected as shown below:

On title page, [54], change "ANINDUCTIVE" to --AN INDUCTIVE--.

Col. 1, line 3, change "ANINDUCTIVE" to --AN INDUCTIVE--.

Signed and Sealed this

Thirtieth Day of April, 1996

Attest:

BRUCE LEHMAN

Attesting Officer

Commissioner of Patents and Trademarks